US008417584B2

(12) United States Patent
Ross

(10) Patent No.: US 8,417,584 B2
(45) Date of Patent: Apr. 9, 2013

(54) PHYSIOLOGICAL RESPONSE OF A CUSTOMER DURING FINANCIAL ACTIVITY

(75) Inventor: Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 287 days.

(21) Appl. No.: 12/846,582

(22) Filed: Jul. 29, 2010

(65) Prior Publication Data

US 2012/0030081 A1     Feb. 2, 2012

(51) Int. Cl.
*G06Q 30/00*     (2012.01)

(52) U.S. Cl.
USPC ....................... 705/26.41; 705/26.1

(58) Field of Classification Search ............... 705/26.41, 705/35, 26.1
See application file for complete search history.

(56) References Cited

U.S. PATENT DOCUMENTS

| | | | |
|---|---|---|---|
| 2005/0222951 A1* | 10/2005 | Sherman | 705/40 |
| 2006/0129469 A1* | 6/2006 | Schmidlin | 705/35 |
| 2007/0073553 A1* | 3/2007 | Flinn et al. | 705/1 |
| 2007/0198382 A1* | 8/2007 | Ferrari | 705/35 |
| 2008/0245854 A1* | 10/2008 | Monden | 235/379 |
| 2008/0249793 A1* | 10/2008 | Angell et al. | 705/1 |
| 2009/0063332 A1* | 3/2009 | Tabaczynski et al. | 705/39 |
| 2011/0208013 A1* | 8/2011 | Phan et al. | 600/301 |
| 2012/0030064 A1* | 2/2012 | Flinn et al. | 705/26.7 |
| 2012/0116186 A1* | 5/2012 | Shrivastav et al. | 600/301 |

OTHER PUBLICATIONS

Lo, Andrew W., Dmitry V. Repin. "The Psychophysiology of Real-time Financial Risk Processing.", Journal of Cognitive Neuroscience. Cambridge: Apr. 1, 2002. vol. 14, Iss.. 3; p. 323.(34 pages).*
Ren, Hongliang, Max Q.-H Meng, Xijun Chen. "Physiological Information Acquisition through Wireless Biomedical Sensor Networks". Department of Electronic Engineering. The Chinese University of Hong Kong. Hong Kong, China. Proceedings of the 2005 IEEE International Conference on Information Acquisition. 2005. pp. 483-488. (6 pages).*
"'Thinking Like a Trader' May Diminish Emotional Reaction and Aversion to Loss". Targeted News Service. Washington, D.C.: Mar 16, 2009. (2 pages).*
Fletcher, R. et al, "iCalm: Wearable Sensor and Network Architecture for Wirelessly Communicating and Logging Autonomic Activity", download Feb. 1, 2010 from IEEE Xplore, pp. 1-9.

* cited by examiner

*Primary Examiner* — Elda Milef
(74) *Attorney, Agent, or Firm* — Michael A. Springs; Moore & Van Allen PLLC; Patrick B. Horne

(57) ABSTRACT

A server behavior modification system assists a customer during a financial activity, such as a transaction, and includes a current financial activity assistance system having a data collection system for collecting current physiological activity data, such as current electrodermal activity data, and a data manipulation system for assessing the likelihood of vulnerability to a predetermined undesired financial behavior, as defined by customer input received by a customer settings definition system. The assessment is based at least in part on the data manipulation system comparing a combined historical behavior pattern with the collected current data. The combined historical behavior pattern comprises a correlation between historical physiological activity data and historical financial activity data. An alerting system instructs a customer behavior modification system to produce an alert based at least in part on an assessment of likely vulnerability to a predetermined undesired financial behavior.

59 Claims, 7 Drawing Sheets

PHYSIOLOGICAL RESPONSE OF A CUSTOMER DURING FINANCIAL ACTIVITY

FIELD

In general, embodiments of the invention relate to physiological response of a customer during financial activity. More specifically, embodiments of the invention relate to systems for assisting a customer to identify when the customer's physiological activity indicates undesired behavior during a financial activity.

BACKGROUND

Financial institution customers have a wide variety of spending habits. In some instances, customers make purchases they later regret, terming such purchases impulse purchases. In situations where large purchases are being considered, some customers' bodies exhibit excitement because of the opportunity to make the large purchase. This phenomenon is demonstrated in many customers by an increased heart rate, which in some cases is noticeable to the customer. In some instances, customers become excited even regarding smaller purchases, and some such customers, unfortunately, cannot help themselves from buying more than they can afford. In today's financial services world, it becomes easier and easier as technologies progress to make more purchases in a given period of time. For example, many financial institutions today issue chip cards allowing customers ease of payment at point of sale terminals. As another example, many financial institutions today offer online banking functionality as well as online purchase functionality, such as making purchases from an online marketplace using a debit or credit account. Hence, a tool for assisting a customer to identify an excited physiological state during a financial activity, such as a transaction, is needed.

Therefore, a behavior modification system for assessing the likelihood of vulnerability to a predetermined undesired financial behavior and alerting the customer is provided.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing methods, computer program products, customer behavior modification systems, and server behavior modification systems for assisting a customer during a financial activity, such as a transaction. The server behavior modification system includes a current financial activity assistance system having a data collection system for collecting current physiological activity data, such as current electrodermal activity data, and a data manipulation system for assessing the likelihood of vulnerability to a predetermined undesired financial behavior, as defined by customer input received by a customer settings definition system. The assessment is based at least in part on the data manipulation system comparing a combined historical behavior pattern with the collected current data. The combined historical behavior pattern comprises a correlation between historical physiological activity data and historical financial activity data. An alerting system instructs a customer behavior modification system to produce an alert based at least in part on an assessment of likely vulnerability to a predetermined undesired financial behavior.

According to embodiments of the present invention, a method for assisting a customer during a financial activity including assisting, by a current financial activity assistance system, the customer during the financial activity. The assisting includes collecting, by a data collection system, current data, and the collecting includes collecting, by the data collection system, current physiological activity data and assessing, by a data manipulation system, the likelihood of vulnerability to a predetermined undesired financial behavior based at least in part on comparing, by the data manipulation system, a combined historical behavior pattern with the collected current data, the combined historical behavior pattern comprising a correlation between historical physiological activity data and historical financial activity data.

In some embodiments, the current financial activity assistance system comprises a server current financial activity assistance system, and the data collection system comprises a processor configured for instructing a customer data collection system to collect the current data comprising collecting the current physiological activity data, and the data manipulation system comprises a server data manipulation system.

In some embodiments, the financial activity comprises a transaction. In some embodiments, the method also includes training, by a training system, to assist the customer during the financial activity, the training including collecting, by the data collection system, historical data comprising the historical physiological activity data and the historical financial activity data, correlating, by the data manipulation system, the historical physiological activity data and the historical financial activity data, and distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the method also includes training, by a training system, to assist the customer during the financial activity, the training including collecting, by the data collection system, historical data comprising the historical physiological activity data, historical global positioning data, and the historical financial activity data, combining, by the data manipulation system, the historical physiological activity data and the historical global positioning data, thereby establishing a combined historical behavior pattern, correlating, by the data manipulation system, the combined historical behavior pattern and the historical financial activity data, and distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the method also includes training, by a training system, to assist the customer during the financial activity, the training including collecting, by the data collection system, historical data comprising the historical physiological activity data, historical temporal data, and the historical financial activity data, combining, by the data manipulation system, the historical physiological activity data and the historical temporal data, thereby establishing a combined historical behavior pattern, correlating, by the data manipulation system, the combined historical behavior pattern and the historical financial activity data, and distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the method also includes training, by a training system, to assist the customer during the financial activity, the training including collecting, by the data collection system, historical data comprising the historical physiological activity data, historical global positioning data, historical temporal data, and the historical financial activity data, combining, by the data manipulation system, the historical physiological activity data, the historical global positioning data, and the historical temporal data, thereby establishing a combined historical behavior pattern, correlating, by the data manipulation system, the combined historical behavior pattern and the historical financial activity data, and distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, assisting the customer during the financial activity also includes producing an alert, by an alerting system, based at least in part on the assessment of the likelihood of vulnerability to the predetermined undesired financial behavior. In some such embodiments, the alerting system comprises a processor configured for instructing the customer alerting system to produce an alert based at least in part on the assessment of the likelihood of vulnerability to the predetermined undesired financial behavior.

In some embodiments, the method also includes defining, by a settings definition system, settings including receiving information from the customer defining a behavior modification index, the information comprising information defining one or more predetermined undesired financial behaviors, and wherein assessing also includes accessing, by the data manipulation system, the information defining the one or more predetermined undesired financial behaviors. In some such embodiments, the information received from the customer defining the behavior modification index comprises information defining one or more spending categories, one or more budget thresholds, one or more specific merchants, one or more categories of merchants, or one or more viewpoints regarding peer customers, and assessing also includes accessing, by the data manipulation system, the behavior modification index, and wherein assessing the likelihood of vulnerability to the predetermined undesired financial behavior is further based at least in part on the accessed behavior modification index.

In some embodiments, the method also includes defining, by a settings definition system, settings including receiving information from the customer establishing a process for rewarding positive behavior modification. The process includes setting a goal and a reward to be given the customer upon reaching the goal.

In some embodiments, the method includes defining, by a settings definition system, settings including receiving information from the customer defining one or more alert output mechanisms, and wherein producing an alert based at least in part on the assessment of the likelihood of vulnerability to the predetermined undesired financial behavior is further based at least in part on the one or more alert output mechanisms.

In some embodiments, the method also includes defining, by a settings definition system, settings including receiving information from the customer defining one or more communication settings, and wherein producing an alert based at least in part on the assessment of the likelihood of vulnerability to the predetermined undesired financial behavior is further based at least in part on the one or more communication settings.

In some embodiments, the method also includes storing, by an information storing system, the assessment of likely vulnerability to the predetermined undesired financial behavior and the customer action in response to the assessment.

In some embodiments, the method also includes storing, by the information storing system, the data regarding assessment of likely vulnerability to the predetermined undesired financial behavior and data regarding the customer action in response to the assessment; and wherein training to assist the customer during the financial activity also includes adding, by the data manipulation system, the current physiological activity data to the historical physiological activity data, adding, by the data manipulation system, the data regarding the customer action in response to the assessment to the historical financial activity data, re-correlating, by the data manipulation system, the historical physiological activity data and the historical financial activity data, and re-distilling, by the data manipulation system, the baseline behavior pattern and the excited behavior pattern from the collected and re-correlated historical data.

In some embodiments, the current physiological activity data comprises electrodermal activity data, the historical physiological activity data comprises historical electrodermal activity data, and the data collection system comprises a processor configured for receiving an electrodermal activity signal from a customer data collection system comprising one or more electrodermal sensors in physiological communication with the customer.

In some embodiments, the current physiological activity data comprises blood pressure data, the historical physiological activity data comprises historical blood pressure data, and the data collection system comprises a processor configured for receiving a blood pressure signal from a customer data collection system comprising one or more blood pressure sensors in physiological communication with the customer.

In some embodiments, the current physiological activity data comprises heart rate data, the historical physiological activity data comprises historical heart rate activity data, and the data collection system comprises a processor configured for receiving a heart rate activity signal from a customer data collection system comprising one or more heart rate sensors in physiological communication with the customer.

In some embodiments, the current physiological activity data comprises blood sugar data, the historical physiological activity data comprises historical blood sugar data, and the data collection system comprises a processor configured for receiving an blood sugar signal from a customer data collection system comprising one or more blood sugar sensors in physiological communication with the customer.

According to embodiments of the present invention, a system for assisting a customer during a financial activity includes a current financial activity assistance system configured for assisting the customer during the financial activity, the current financial activity assistance system including a data collection system configured for collecting current data, the collecting comprising collecting current physiological activity data, and a data manipulation system configured for assessing the likelihood of vulnerability to a predetermined undesired financial behavior based at least in part on comparing a combined historical behavior pattern with the collected current data, the combined historical behavior pattern including a correlation between historical physiological activity data and historical financial activity data.

In some embodiments, the current financial activity assistance system comprises a server current financial activity assistance system, and the data collection system comprises a processor configured for instructing a customer data collection system to collect the current data comprising collecting the current physiological activity data, and wherein the data manipulation system comprises a server data manipulation system.

In some embodiments, the financial activity comprises a transaction. In some embodiments, the current financial activity assistance system also includes a training system configured to assist the customer during the financial activity, the training system comprising a data collection system and a data manipulation system, the data collection system configured for collecting historical data comprising the historical physiological activity data and the historical financial activity data, the data manipulation system configured for correlating the historical physiological activity data and the historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the current financial activity assistance system further comprises a training system configured to assist the customer during the financial activity, the training system comprising a data collection system and a data manipulation system, the data collection system configured for collecting historical data, the historical data comprising the historical physiological activity data, historical global positioning data, and the historical financial activity data, the data manipulation system configured for combining the historical physiological activity data and the historical global positioning data, thereby establishing a combined historical behavior pattern, correlating the combined historical behavior pattern and the historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the current financial activity assistance system further comprises a training system configured to assist the customer during the financial activity, the training system comprising a data collection system and a data manipulation system, the data collection system configured for collecting historical data comprising the historical physiological activity data, historical temporal data, and the historical financial activity data, the data manipulation system configured for combining the historical physiological activity data and the historical temporal data, thereby establishing a combined historical behavior pattern, correlating the combined historical behavior pattern and the historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the current financial activity assistance system further comprises a training system configured to assist the customer during the financial activity, the training system comprising a data collection system and a data manipulation system, the data collection system configured for collecting historical data comprising the historical physiological activity data, historical global positioning data, historical temporal data, and the historical financial activity data; the data manipulation system configured for combining the historical physiological activity data, the historical global positioning data, and the historical temporal data, thereby establishing a combined historical behavior pattern, correlating the combined historical behavior pattern and the historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the current financial activity assistance system further comprises an alerting system configured for producing an alert based at least in part on the assessment of the likelihood of vulnerability to the predetermined undesired financial behavior. In some such embodiments, the alerting system comprises a processor configured for instructing a customer alerting system to produce an alert based at least in part on the assessment of the likelihood of vulnerability to the predetermined undesired financial behavior.

In some embodiments, a settings definition system is configured for defining settings comprising receiving information from the customer defining a behavior modification index, the information comprising information defining one or more predetermined undesired financial behaviors, and wherein the data manipulation system is further configured for accessing the information defining the one or more predetermined undesired financial behaviors. In some such embodiments, the information received from the customer defining the behavior modification index comprises information defining one or more spending categories, one or more budget thresholds, one or more specific merchants, one or more categories of merchants, or one or more viewpoints regarding peer customers, and wherein the data manipulation system is further configured for accessing the behavior modification index, and assessing the likelihood of vulnerability to the predetermined undesired financial behavior is further based at least in part on the accessed behavior modification index.

In some embodiments, the system further includes a settings definition system configured for defining settings comprising receiving information from the customer establishing a process for rewarding positive behavior modification, the process comprising setting a goal and a reward to be given the customer upon reaching the goal.

In some embodiments, the alerting system is further configured for defining settings comprising receiving information from the customer defining one or more alert output mechanisms, and producing an alert based at least in part on the assessment of the likelihood of vulnerability to the predetermined undesired financial behavior and further based at least in part on the one or more alert output mechanisms.

In some embodiments, the alerting system is further configured for defining settings comprising receiving information from the customer defining one or more alert output mechanisms, and producing an alert based at least in part on the assessment of the likelihood of vulnerability to the predetermined undesired financial behavior and further based at least in part on the one or more communication settings.

In some embodiments, the system also includes an information storing system configured for storing the assessment of likely vulnerability to the predetermined undesired financial behavior and the customer action in response to the assessment.

In some embodiments, the system also includes an information storing system configured for storing the data regarding assessment of likely vulnerability to the predetermined undesired financial behavior and data regarding the customer action in response to the assessment; and wherein the data manipulation system is further configured for adding the current physiological activity data to the historical physiological activity data, adding the data regarding the customer action in response to the assessment to the historical financial activity data, re-correlating the historical physiological activity data and the historical financial activity data, and re-distilling the baseline behavior pattern and the excited behavior pattern from the collected and re-correlated historical data.

In some embodiments, the current physiological activity data comprises electrodermal activity data, the historical physiological activity data comprises historical electrodermal activity data, and wherein the data collection system comprises a processor configured for receiving an electrodermal activity signal from a customer data collection system comprising one or more electrodermal sensors in physiological communication with the customer.

In some embodiments, the current physiological activity data comprises blood pressure data, the historical physiological activity data comprises historical blood pressure data, and wherein the data collection system comprises a processor configured for receiving a blood pressure signal from a customer data collection system comprising one or more blood pressure sensors in physiological communication with the customer.

In some embodiments, the current physiological activity data comprises heart rate data, the historical physiological activity data comprises historical heart rate activity data, and wherein the data collection system includes a processor configured for receiving a heart rate activity signal from a customer data collection system comprising one or more heart rate sensors in physiological communication with the customer.

In some embodiments, the current physiological activity data comprises blood sugar data, the historical physiological activity data comprises historical blood sugar data. and wherein the data collection system comprises a processor configured for receiving an blood sugar signal from a customer data collection system comprising one or more blood sugar sensors in physiological communication with the customer.

According to embodiments of the present invention, a computer program product comprising a non-transitory computer-readable medium comprising computer-readable instructions for execution by a behavior modification system. The instructions are configured for assisting a customer during a financial activity and include instructions for assisting, by a current financial activity assistance system, the customer during the financial activity, the instructions for assisting comprising instructions for collecting, by a data collection system, current data, the instructions for collecting comprising instructions for collecting, by the data collection system, current physiological activity data, and instructions for assessing, by a data manipulation system, the likelihood of vulnerability to a predetermined undesired financial behavior based at least in part on instructions for comparing, by the data manipulation system, a combined historical behavior pattern with the collected current data, the combined historical behavior pattern comprising a correlation between historical physiological activity data and historical financial activity data. In some such embodiments, the instructions further comprise instructions for training, by a training system, to assist the customer during the financial activity, the instructions for training comprising instructions for collecting, by the data collection system, historical data comprising the historical physiological activity data and the historical financial activity data, instructions for correlating, by the data manipulation system, the historical physiological activity data and the historical financial activity data, and instructions for distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In other such embodiment, the instructions further comprise instructions for training, by a training system, to assist the customer during the financial activity, the training comprising instructions for collecting, by the data collection system, historical data comprising the historical physiological activity data, historical global positioning data, historical temporal data, and the historical financial activity data, instructions for combining, by the data manipulation system, the historical physiological activity data, the historical global positioning data, and the historical temporal data, thereby establishing a combined historical behavior pattern, instructions for correlating, by the data manipulation system, the combined historical behavior pattern and the historical financial activity data, and instructions for distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the instructions for assisting the customer during the financial activity further comprise instructions for producing an alert, by an alerting system, based at least in part on the assessment of the likelihood of vulnerability to the predetermined undesired financial behavior.

In some embodiments, the instructions further comprise instructions for defining, by a settings definition system, settings comprising instructions for receiving information from the customer defining a behavior modification index, the information comprising information defining one or more predetermined undesired financial behaviors; and wherein the instructions for assessing the likelihood of vulnerability to a predetermined undesired financial behavior further comprise instructions for accessing, by the data manipulation system, the information defining the one or more predetermined undesired financial behaviors.

In some embodiments, the instructions further comprise instructions for defining, by a settings definition system, settings comprising instructions for receiving information from the customer establishing a process for rewarding positive behavior modification, the process comprising setting a goal and a reward to be given the customer upon reaching the goal.

In some embodiments, the instructions also include instructions for storing, by the information storing system, the data regarding assessment of likely vulnerability to the predetermined undesired financial behavior and data regarding the customer action in response to the assessment; and wherein the instructions for training to assist the customer during the financial activity further comprise instructions for adding, by the data manipulation system, the current physiological activity data to the historical physiological activity data instructions for adding, by the data manipulation system, the data regarding the customer action in response to the assessment to the historical financial activity data instructions for re-correlating, by the data manipulation system, the historical physiological activity data and the historical financial activity data; and instructions for re-distilling, by the data manipulation system, the baseline behavior pattern and the excited behavior pattern from the collected and re-correlated historical data.

In some embodiments, the current physiological activity data comprises electrodermal activity data; the historical physiological activity data comprises historical electrodermal activity data; and wherein the instructions further comprise, and instructions for receiving an electrodermal activity signal from a customer data collection system comprising one or more electrodermal sensors in physiological communication with the customer.

According to embodiments of the present invention, a method for assisting a customer during a financial activity includes assisting, by a customer current financial activity assistance system, the customer during the financial activity, the assisting comprising, collecting, by a data collection system, current data, the collecting comprising collecting, by the data collection system, current physiological activity data, communicating, by a communication device, the current physiological activity data to a server behavior modification system for assessment, by the server behavior modification system, of the likelihood of vulnerability to a predetermined undesired financial behavior; receiving, by a customer alerting system, instructions for producing an alert based at least in part on the server behavior modification system assessment of the likelihood of vulnerability to the predetermined undes-ired financial behavior; and producing an alert based at least in part on the received instructions. In some such embodiments, the method also includes collecting, by the data collection system, historical data comprising the historical physiological activity; and communicating, by the communication device, the historical data to the server behavior modification system for correlation of the historical physiological activity data and historical financial activity data and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In other such embodiments, collecting, by the data collection system, historical data comprising the historical physiological activity data, historical global positioning data, and historical temporal data; and communicating, by the communication device, the historical data to the server behavior modification system for combining the historical physiological activity data, the historical global positioning data, and the historical temporal data, thereby establishing a combined historical behavior pattern, correlation of the combined historical behavior pattern and historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the method also includes receiving information, by a customer information receiving system, defining a behavior modification index, the information comprising information defining one or more predetermined undesired financial behaviors; and communicating, by the communication device, the information to the server behavior modification system.

In some embodiments, wherein collecting the current physiological activity data comprises collecting, by an electrodermal sensor of the data collection system in physiological communication with the customer, electrodermal activity data, and wherein collecting historical data comprises collecting, by the electrodermal sensor, historical electrodermal activity data.

According to embodiments of the present invention, acustomer behavior modification system configured for assisting a customer during a financial activity includes a customer financial activity assistance system configured for assisting the customer during the financial activity, the customer financial activity assistance system comprising a data collection system configured for collecting current data comprising current physiological activity data, a communication device configured for communicating the current physiological activity data to a server behavior modification system for assessment, by the server behavior modification system, of the likelihood of vulnerability to a predetermined undesired financial behavior, and a customer alerting system configured for receiving instructions for producing an alert based at least in part on the server behavior modification system assessment of the likelihood of vulnerability to the predetermined undesired financial behavior, and producing an alert based at least in part on the received instructions.

In some embodiments, the data collection system further configured for collecting historical data comprising the historical physiological activity; and wherein the communication device is further configured for communicating the historical data to the server behavior modification system for correlation of the historical physiological activity data and historical financial activity data and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the data collection system is further configured for collecting historical data comprising the historical physiological activity data, historical global positioning data, and historical temporal data; and wherein the communication device is further configured for communicating the historical data to the server behavior modification system for combining the historical physiological activity data, the historical global positioning data, and the historical temporal data, thereby establishing a combined historical behavior pattern, correlation of the combined historical behavior pattern and historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In some embodiments, the customer behavior modification system also includes a customer information receiving system configured for receiving information defining a behavior modification index, the information comprising information defining one or more predetermined undesired financial behaviors; and wherein the communication device is further configured for communicating the information to the server behavior modification system.

In some embodiments, the data collection system comprises an electrodermal sensor in physiological communication with the customer, the electrodermal sensor configured for collecting the historical physiological activity data and the current physiological activity data, the historical physiological activity data comprising historical electrodermal activity data and the current physiological activity data comprising current electrodermal activity data.

According to embodiments of the present invention, a computer program product comprising a non-transitory computer-readable medium comprises computer-readable instructions for execution by a customer behavior modification system, the instructions configured for assisting a customer during a financial activity. The instructions including instructions for assisting, by a customer current financial activity assistance system, the customer during the financial activity, the instructions for assisting comprising instructions for collecting, by a data collection system, current data, the instructions for collecting comprising instructions for collecting, by the data collection system, current physiological activity data, instructions for communicating, by a communication device, the current physiological activity data to a server behavior modification system for assessment, by the server behavior modification system, of the likelihood of vulnerability to a predetermined undesired financial behavior, instructions for receiving, by a customer alerting system, instructions for producing an alert based at least in part on the server behavior modification system assessment of the likelihood of vulnerability to the predetermined undesired financial behavior, and instructions for producing an alert based at least in part on the received instructions. In some such embodiments, the instructions also include instructions for collecting, by the data collection system, historical data comprising the historical physiological activity; and instructions for communicating, by the communication device, the historical data to the server behavior modification system for correlation of the historical physiological activity data and historical financial activity data and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In other such embodiments, the instructions also including instructions for collecting, by the data collection system, historical data comprising the historical physiological activity data, historical global positioning data, and historical temporal data; and instructions for communicating, by the communication device, the historical data to the server behavior modification system for combining the historical physiological activity data, the historical global positioning data, and the historical temporal data, thereby establishing a combined historical behavior pattern, correlation of the combined historical behavior pattern and historical financial activity data, and distilling at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

In other such embodiments, the instructions also include instructions for receiving information, by a customer information receiving system, defining a behavior modification index, the information comprising information defining one or more predetermined undesired financial behaviors; and instructions for communicating, by the communication device, the information to the server behavior modification system.

In some embodiments, the instructions for collecting the current physiological activity data comprise instructions for collecting, by an electrodermal sensor of the data collection system in physiological communication with the customer, electrodermal activity data, and wherein the instructions for collecting historical data comprise instructions for collecting, by the electrodermal sensor, historical electrodermal activity data.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1:
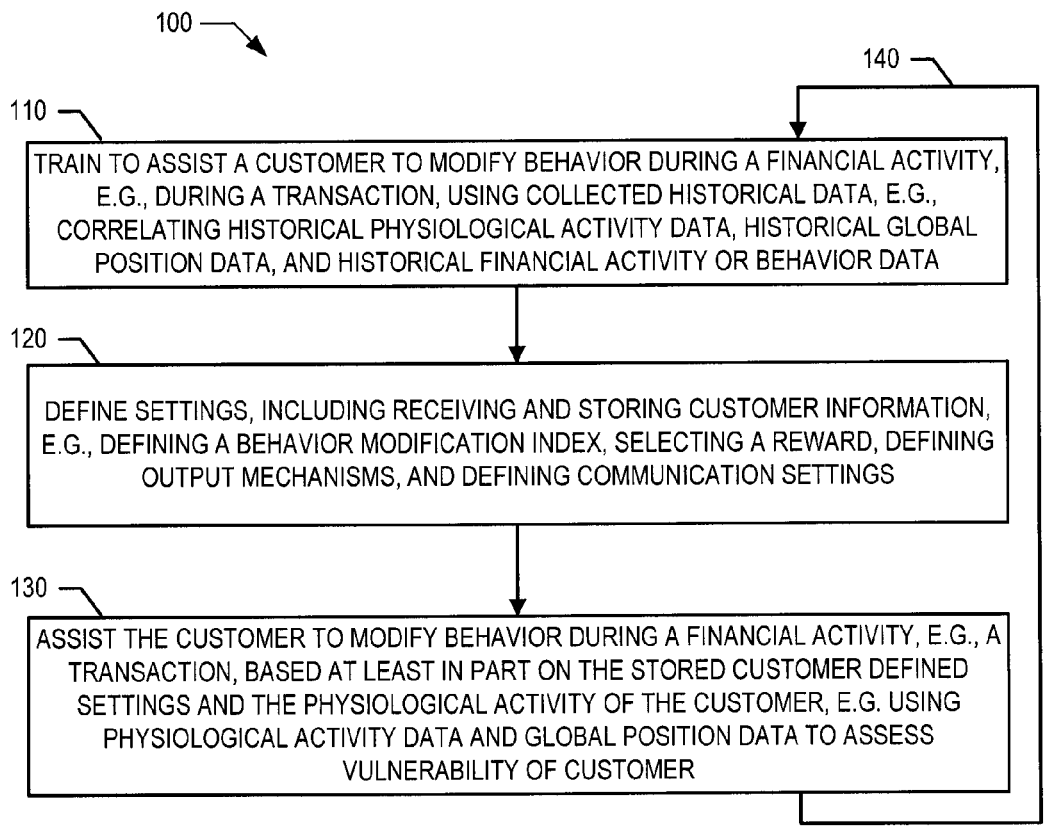
Figure 2:
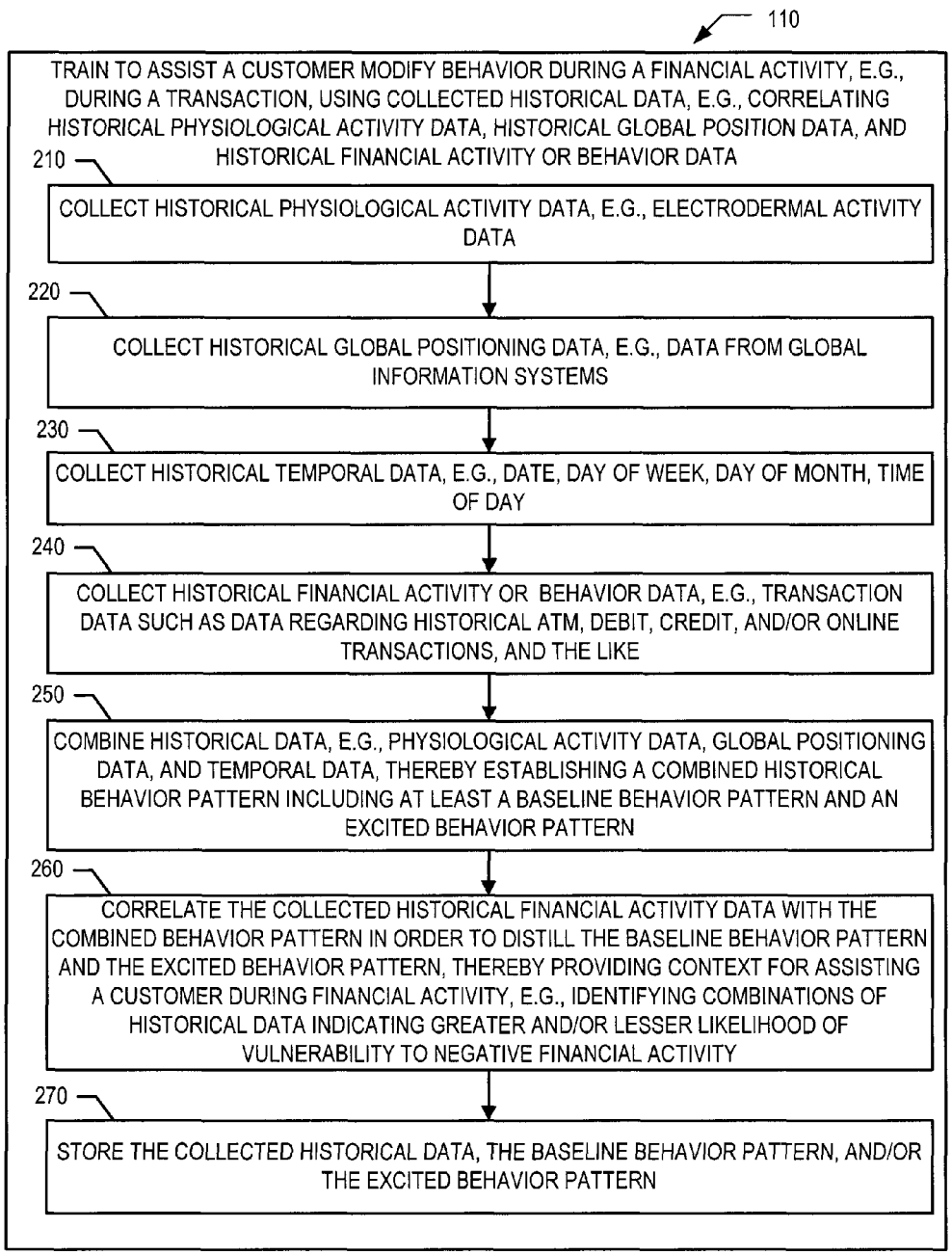
Figure 3:
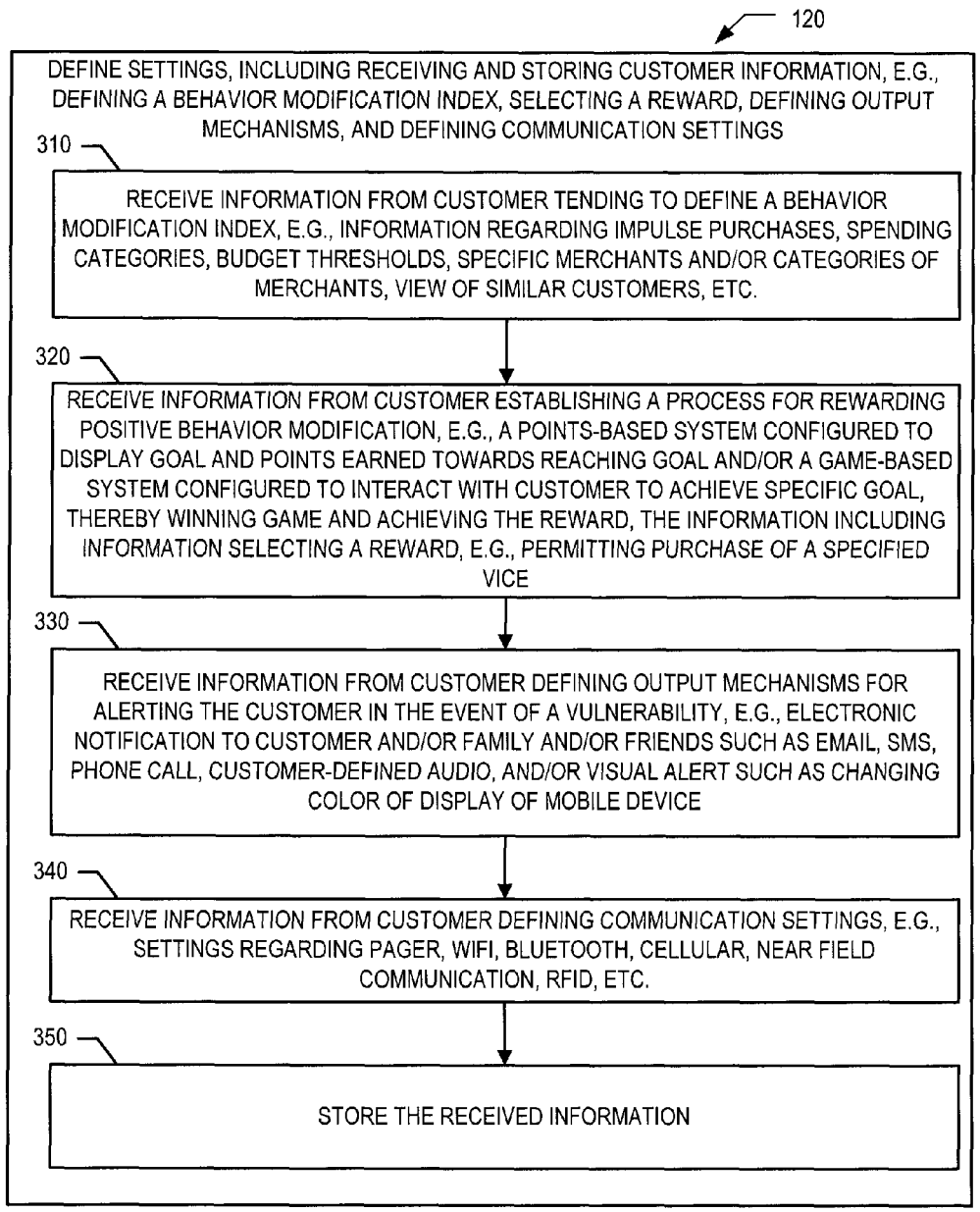
Figure 4:
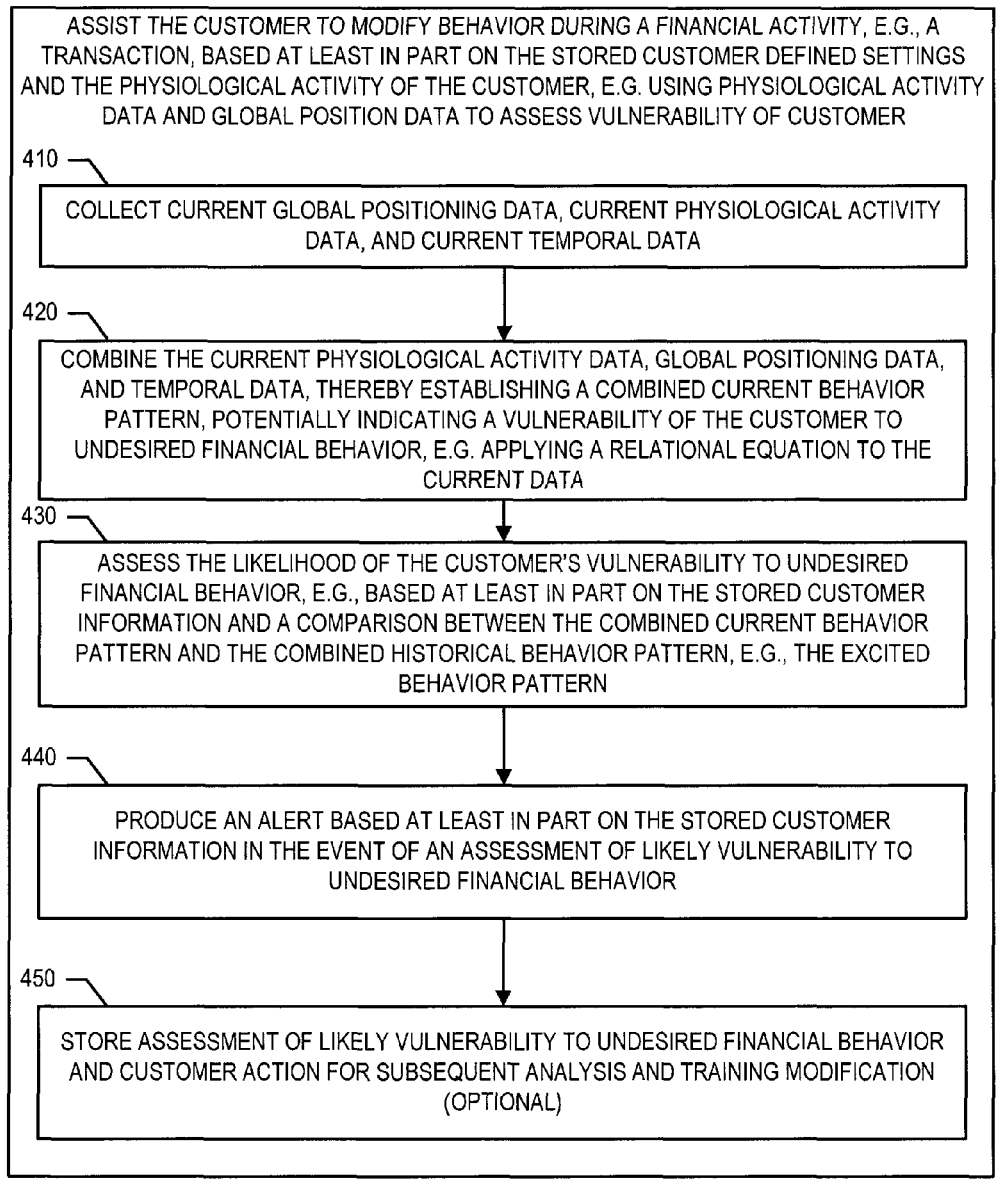
Figure 5A:
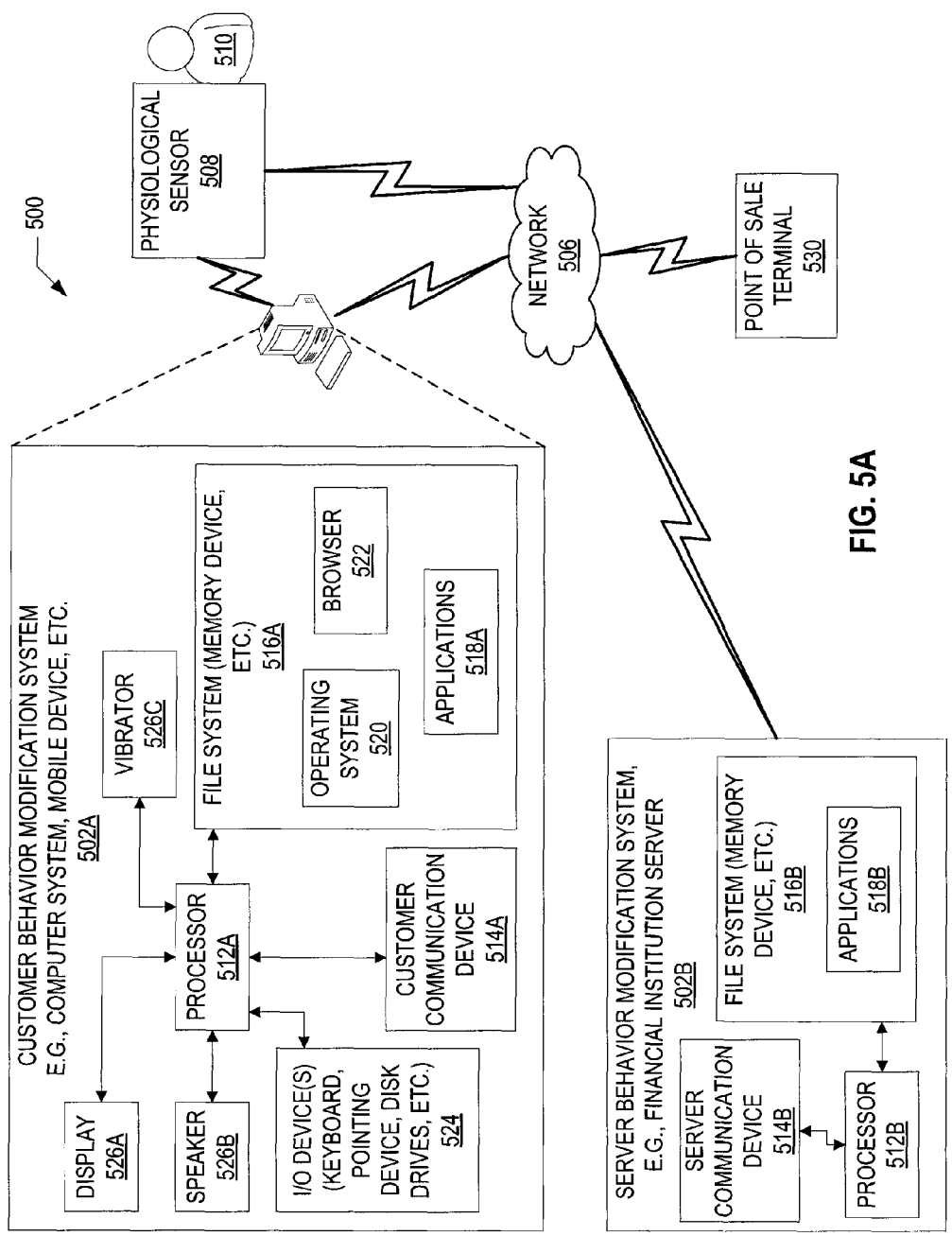
Figure 5B:
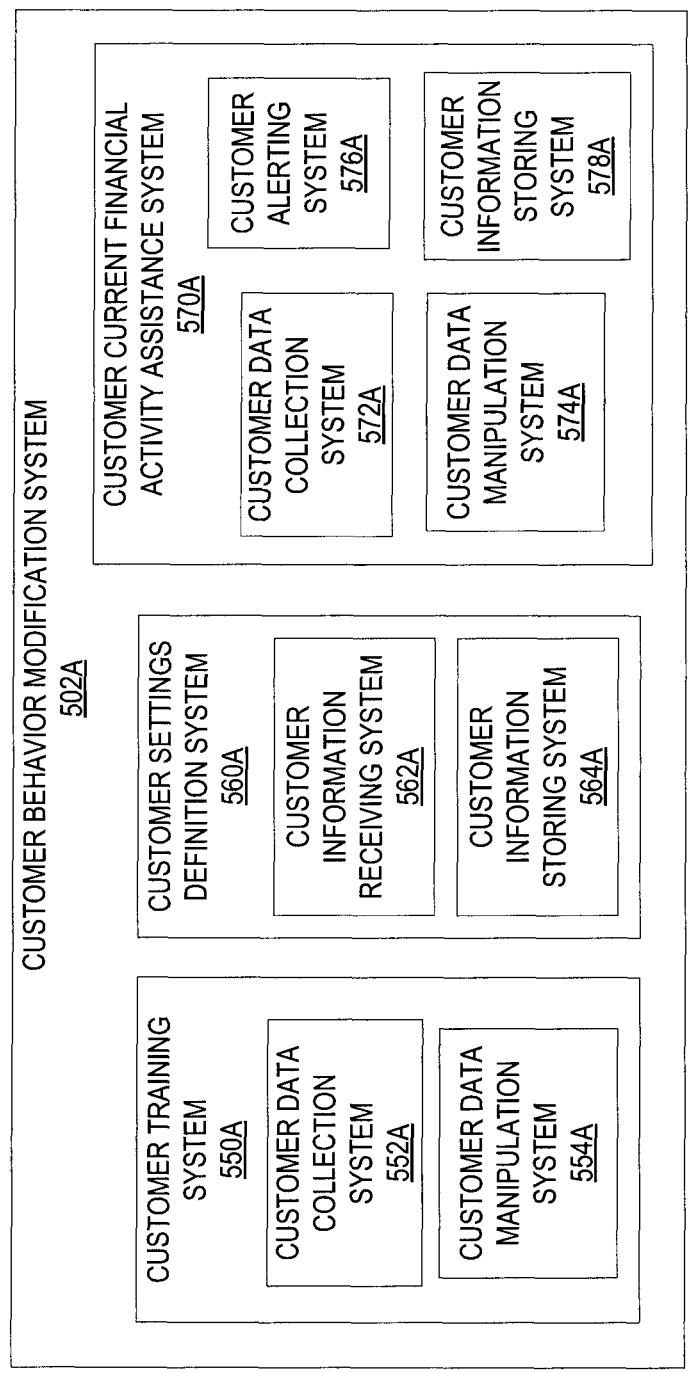
Figure 5C:
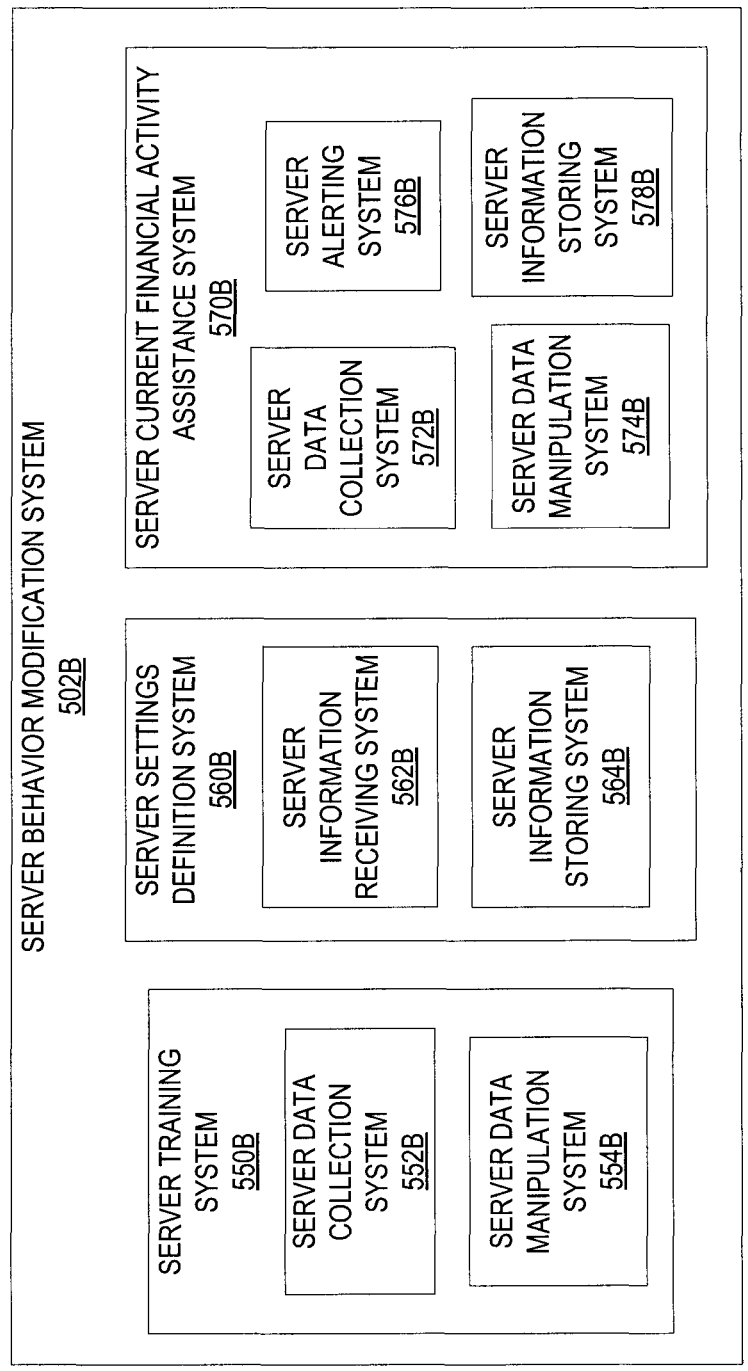

Having thus described embodiments of the invention in general terms, reference will now be made to the accompanying drawings, wherein:

FIG. 1 is a flowchart illustrating a method for assisting a customer during a financial activity according to embodiments of the present invention;

FIG. 2 is a flowchart illustrating a method for training to assist a customer to modify behavior during a financial activity according to embodiments of the present invention;

FIG. 3 is a flowchart illustrating a method for defining settings including receiving and storing customer information according to embodiments of the present invention;

FIG. 4 is a flowchart illustrating a method for assisting the customer to modify behavior during a financial activity according to embodiments of the present invention;

FIG. 5A is a block diagram of a financial activity environment according to embodiments of the present invention;

FIG. 5B is a block diagram of a customer behavior modification system according to embodiments of the present invention; and FIG. 5C is a block diagram of a server behavior modification system according to embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention provide for methods, computer program products, customer behavior modification systems, and server behavior modification systems for assisting a customer during a financial activity, such as a transaction. The server behavior modification system includes a current financial activity assistance system having a data collection system for collecting current physiological activity data, such as current electrodermal activity data, and a data manipulation system for assessing the likelihood of vulnerability to a predetermined undesired financial behavior, as defined by customer input received by a customer settings definition system. The assessment is based at least in part on the data manipulation system comparing a combined historical behavior pattern with the collected current data. The combined historical behavior pattern comprises a correlation between historical physiological activity data and historical financial activity data. An alerting system instructs a customer behavior modification system to produce an alert based at least in part on an assessment of likely vulnerability to a predetermined undesired financial behavior.

Throughout the description of FIGS. 1-4, reference will be made to systems for performing the various method steps discussed. Such systems and their sub-systems or components are discussed specifically with reference to FIGS. 5A-5C below.

Referring to FIG. 1, a flowchart illustrates a method 100 for assisting a customer during a financial activity according to embodiments of the present invention.

As represented by block 110, the first step is to train to assist a customer to modify behavior during a financial activity. The training is performed, for example, during a training period, by a training system 550 of a behavior modification system 502, which in various embodiments is or includes a customer training system 550A of a customer behavior modification system 502A and/or a server training system 550B of a server behavior modification system 502B. The systems 550A and 550B are typically in communication with one another, as shown in FIGS. 5A-5C. The training period, in various embodiments, is any length of time, such as no time, one hour, one day, one week, one month, one year, or any other period of time. In some embodiments, the customer defines the training period while inputting information during the defining settings step 120 discussed below.

The behavior modification system 502 collects historical physiological data, as well as, in some embodiments, historical global position data, historical temporal data and other historical data to correlate with historical financial activity (or behavior) data. This correlation, as discussed further below, distills patterns in the data later used to assist during present financial activity. As used herein the term "financial activity" refers to any transaction between a customer and a financial institution, any interaction of a customer involving one or more accounts maintained by a financial institution, any interaction of a customer when considering any such transaction or such interaction, any interaction of a customer after considering any such transaction or such interaction, any interaction of a customer after actually performing the transaction or interaction or the like.

The next step, as represented by block 120, is to define settings. Many different types of settings are defined in various embodiments of the invention. In some embodiments, for example, the behavior modification system 502 receives and stores customer information. The customer information, in some embodiments, includes information defining a behavior modification index, information regarding selecting a reward for positive behavior modification, information defining output mechanisms, information defining communication settings, and the like. The settings are defined, for example, by a settings definition system 560 of the behavior modification system 502, which in various embodiments, is or includes a customer settings definition system 560A of the customer behavior modification system 502A and/or a server settings definition system 560B of the server behavior modification system 502B.

As represented by block 130, the next step is to assist the customer to modify his or her behavior during a financial activity based at least in part on the stored customer defined settings and the physiological activity of the customer. In some embodiments, for example, step 130 includes using the physiological activity data as well as global positioning data to assess the vulnerability of the customer, such as, to a predetermined undesired financial behavior. The assisting is performed, for example, during a financial activity, such as immediately before, during or immediately after a transaction, by a current financial activity assistance system 570 of the behavior modification system 502, which in various embodiments is or includes a customer current financial activity assistance system 570A of the customer behavior modification system 502A and/or a server current financial activity assistance system 570B of a server behavior modification system 502B. The systems 570A and 570B are typically in communication with one another, as shown in FIGS. 5A-5C.

As represented by arrow 140, the system 502, in some embodiments, includes active feedback during operation, thereby permitting the system 502 to learn. More specifically, after the training period is over (step 110) and the settings have been defined (step 120), the system 502 is operating in an assistance mode based on method 130. During such operation, the system 502 can periodically, or upon occurrence of specific triggering events, such as an assessment of high vulnerability and/or specifically defined financial behavior such as a particular type of purchase, the system 502 can "re-train" by re-performing one or more of the training steps discussed with reference to FIG. 2 below, such as, for example, re-collecting historical data, re-combining the historical data, re-correlating the historical data, and re-distilling behavior patterns. In this regard, the system 502 can continue to "learn" about the customer's financial habits and provide more valuable information and alerting to the customer going forward. In some embodiments, the system 502 also redefines settings (step 120) either periodically or upon occurrence of some particular event, such as, for example, the customer indicating a desire to redefine the settings.

Referring now to FIG. 2, a flowchart illustrates a method 110, originally presented as block 110 in FIG. 1, for training to assist a customer to modify behavior during a financial activity according to embodiments of the present invention. The first step, as represented by block 210 is to collect historical physiological activity data. For example, in one embodiment, historical electrodermal activity data is collected by one or more electrodermal sensors in physiological communication with the customer. In some embodiments, the one or more electrodermal sensor produce signals including information representing the state of the customer's electrodermal activity and communicate such signals to either the customer behavior modification system 502A and/or the server behavior modification system 502B.

In various other embodiments, historical global positioning data, for example, data from global information systems is collected as represented by block 220. Global positioning data, of course, represents the location of the customer. Such location information is useful to the system 502 in that, the global positioning data can represent, locations of particular concern for the customer. For example, in one embodiment, the customer sets a goal not to eat ice cream, and inputs settings (see step 120) indicating to the system that ice cream stores are locations where there is a vulnerability for undesired financial behavior, namely in this case, purchasing (and eating) ice cream. The system 502, taking into account historical global positioning data as well as historical financial activity data, can train to alert the customer to the proximity of an ice cream store. In this regard, the system 502 can assist the customer by reminding the customer of the potential vulnerability. Then, if the customer does act on the vulnerability, the system can store a record of the action (see step 450 discussed below) so that the customer can later evaluate his or her performance. Furthermore, as discussed with regard to step 320 (discussed below), the system 502 can provide incentives or rewards (such as approval or permission for making a purchase) for assisting the customer to improve their financial behavior. The present example involves one of the customer's vices—eating ice cream—which could be defined as the reward for improving financial behavior. In other embodiments wherein historical global positioning data is collected, the system 502 can recognize location of particularly lower vulnerability to negative financial behavior. For example, in one embodiment, the system 502 correlates beaches with areas where the customer is much less likely to make impulse purchases, and, in some embodiments, alerts the customer as the customer travels away from areas of high vulnerability, such as, for example, a retail mall, and toward, for example, the beach.

In some embodiments, the customer behavior modification system 502A is or includes a mobile device, such as a cellular phone, a smartphone, a personal digital assistant (PDA), a laptop computer, a portable processing device, a GPS receiver, a pager, a Bluetooth-enabled device, a Near Field communication-enabled device, an RFID device, a wristband or other wearable article having processing capabilities, such as those described in U.S. patent application Ser. No. 12/846,573, titled "Wearable Article Having Point of Sale Payment Functionality", to Naelon and filed concurrently herewith and U.S. patent application Ser. No. 12/846,576, titled "Wearable Financial Indicator", to Ross et al. and filed concurrently herewith, both of which are incorporated herein by reference in their entirety and both of which are assigned to the assignee of the present application. In some such embodiments, the mobile device is configured to communicate with the server behavior modification system 502B and provide alerts to the customer regarding the customer's vulnerability to undesired financial behavior. For example, in some embodiments, the mobile device includes a display such as a colored LED display configured for alerting the customer with a red colored alert when the customer is more vulnerable, a yellow alert when the customer is somewhat vulnerable and a green alert when the customer is less vulnerable. In the example discussed above regarding global positioning data, the system 502 can alert the customer with a red alert when the customer is proximate a retail mall, a yellow alert as the customer moves away from the retail mall, and a green alert when the customer moves toward the beach.

As represented by block 230, in various other embodiments, historical temporal data, for example, data, day of week, day of month, time of day and the like, is collected. This temporal data represents, similar to the global positioning data, is useful in that it can assist the system 502 in determining the level of vulnerability for negative financial behavior. For example, in one embodiment, where historical temporal data is collected, a customer has a habit of purchasing several magazine or newspapers every morning on the way to work. The customer, in this example, has made a decision that he or she, as a general goal, does not want to purchase those periodicals any longer in order to save money. In this example, the historical temporal data, which will be correlated with historical financial data as discussed below will indicate to the system the exact dates, times, and the like that the customer is most vulnerable for making the undesired purchase. In such cases, various alerting mechanisms can be used to alert the customer to vulnerability, and as discussed herein, various rewards, games and the like can be used to deter the customer during a time of vulnerability. In some embodiments, discussed herein, the alert is sent to one or more friends or family of the customer in the event of a predetermined level of vulnerability so that those people can provide the customer with increased accountability for financial behavior. In some embodiments, combining the examples discussed above, when the customer is within a predetermined distance of a periodical store during a particular time of day an alert is generated, either to the customer and/or to one or more accountability partners.

Next, as represented by block 240, historical financial activity (or behavior) data is collected. For example, in some embodiments, transaction data such as data regarding one or more historical automated teller machine (ATM) transactions, debit transactions, credit transactions, and/or online transactions including online banking transaction and online merchant transactions, and the like, is collected. The collected historical financial activity data typically includes type and amount of purchases and includes, in some embodiments, data indicating the merchant from which a purchase was made, and in some embodiments, data including the category of the merchant from which the purchase was made. For example, in some embodiments, a customer purchases a child toy from a child toy store, and the historical data collected includes data indicating the type of purchase, that is, a child toy in this case; data indicating the quantity of the purchase, that is, one in this case; data indicating the amount of the purchase, for example, $10.00; and data indicating the category of merchant from which the purchase was made, that is, a toy store in this case. In various embodiments, numerous different combinations of data fields are collected and subsequently manipulated such as by correlation and distillation as discussed below. In some embodiments, the system 502 receives input from the customer regarding some or all the historical financial activity data, such as, for example, whether the customer considers a particular transaction or purchase to be a negative or undesired financial behavior, and likewise, whether the customer considers a transaction to be a positive or desired financial behavior. Accordingly, during the correlation step 260 the system properly distills the baseline behavior pattern and excited behavior pattern based on whether specific activities are considered by the customer to be undesired and/or desired. In other embodiments, standards are established such that particular categories of purchases or purchases at certain times of day or otherwise are automatically considered either desired or undesired. As another example, purchases when the customer's physiological data indicates an extremely high level of excitement may be automatically flagged as undesired transactions. In some embodiments, when the settings are defined in step 120, the customer inputs information regarding these various categories and thresholds for discerning undesired versus desired behavior.

The various historical data collection steps, that is, 210, 220, 230, and/or 240 are performed, in some embodiments, by the customer data collection system 552A of the customer behavior modification system 502A and by the server data collection system 552B of the server behavior modification system 502B. In some embodiments, the customer data collection system 552A is coupled with the server data collection system 552B such that the server data collection system 552B, which includes a processor such as processor 512B instructs the customer data collection system 552A to collect the historical data. In some embodiments, the customer data collection system 552A includes one or more physiological sensors 508 and in other embodiments, the customer data collection system 552A is coupled with one or more external physiological sensors 508 for collecting the historical physiological data as discussed elsewhere herein. In some embodiments, the customer data collection system 552A includes one or more other sensors and/or receivers. In yet other embodiments, the customer data collection system 552A is coupled with the one or more other sensors and/or receivers. For example, in some embodiments wherein global positioning data is collected, the customer data collection system 552A includes one or more global positioning system (GPS) or global information systems (GIS) receivers and/or transceivers. As another example, in other embodiments wherein historical temporal data is collected, the customer data collection system 552A includes a time-keeping device such as a clock. In some embodiments, the time-keeping device is in communication with one or more external time sources, such as a cellular telephone system for providing an accurate time to the time-keeping device. In other embodiments, the time-keeping device has a clock that keeps time without reliance on an external data source.

Next, as represented by block 250, the collected historical data is combined. For example, in some embodiments, the historical physiological activity data, the global positioning data, the temporal data and any other historical data collected are combined, thereby establishing a combined historical behavior pattern. The combined historical behavior pattern, in some embodiments, includes at least a baseline behavior pattern and an excited behavior pattern. The baseline behavior pattern represents combinations of variables, that is, combinations of physiological data, global positioning data, and temporal data where the customer was less vulnerable to undesired financial behavior. The excited behavior patter represents combination of variables, that is, combination of physiological data, global positioning data, and temporal data where the customer was more vulnerable to undesired financial behavior. Of course, without taking into account the historical financial data, in some cases, it may be difficult to discern the distinction between the baseline behavior pattern and the excited behavior pattern. However, in some embodiments, the distinction is made based on known indicators for undesired financial behavior. For example, in one embodiment, heightened physiological activity is known as an indicator for higher vulnerability. Likewise, locations proximal shopping complexes are known as an indicator for higher vulnerability. Further, times of day such as just before work and just after work are known as indicators for higher vulnerability. Hence, in some embodiments, the system 502 can determine the level of vulnerability taking into some or all the historical data without taking into account historical financial activity data. In some embodiments, the training period begins with the system 502 establishing the baseline behavior pattern and the excited behavior pattern based on known historical data correlation with known financial behaviors as the example above illustrates. Then, as the customer performs financial activities, historical financial data is collected and then correlated as discussed below.

As represented by block 260, the next step is to correlate the collected historical financial activity data with the combined behavior pattern from step 250, thereby providing context for assisting the customer during financial activities in the future (see step 130). For example, in some embodiments, the correlation includes identifying combinations of historical data points representing either high or low vulnerability for undesired financial behavior, and in other embodiments the correlation includes identifying combinations of historical data points representing instances of desired versus undesired behavior. Accordingly, the baseline behavior pattern, which includes a pattern of historical data points correlated to indicate instances of desired behavior or "normal" behavior and the excited behavior pattern, which includes a pattern of historical data points correlated to indicate instances of undesired behavior or "abnormal" behavior are distilled by a data manipulation system 574, such as the customer data manipulation system 574A of the customer behavior modification system 502A and/or the server data manipulation system 574B of the server behavior modification system 502B. In some embodiments, the customer data collection system 572A collects all the historical data (steps 210, 220, 230, and/or 240), a customer communication device 514A communicates the historical data to the server communication device 514B where the server data manipulation system 574B, which includes a processor 512B, combines the historical data (step 250) and then manipulates the historical data to distill the behavior patterns (step 260). In some embodiments, the behavior patterns, that is, the baseline behavior pattern and the excited behavior pattern are then stored in a memory device, such as memory device 516A of the customer behavior modification system 502A or memory device 516B of the server behavior modification system 502B. In some embodiments wherein the behavior patterns are stored at the customer behavior modification system, the customer behavior modification system is configured to perform step 130 discussed below, and in others, where the behavior modification patterns are stored at the server behavior modification system 502B, the server behavior modification system 502B is configured to perform step 130 discussed below. In yet other embodiments, the behavior modification patterns can be stored at one or the other behavior modification system 502A or 502B, accessed by the other behavior modification system 502B or 502A, respectively, and the other behavior modification system 502B or 502A then performs step 130 discussed below.

As represented by block 270, the next step is to store the collected historical data, the baseline behavior pattern and/or the excited behavior pattern. The data and/or patterns are stored, in some embodiments, at a memory device 516A of the customer behavior modification system 502A, and in other embodiments at a memory device 516B of the server behavior modification system 502B. In other embodiments, the data and/or patterns are stored in both and in other embodiments pieces of the information are stored in one or the other memory device 516A or 516B.

Referring now to FIG. 3, a flowchart illustrates a method 120, originally presented as block 120 in FIG. 1, for defining settings including receiving and storing customer information according to embodiments of the present invention. For example, in some embodiments, settings are defined for a behavior modification index, selecting a reward, defining output mechanisms and communication, such as between the server behavior modification system 502B and the customer behavior modification system 502A.

As represented by block 310, the first step is to receive information from the customer tending to define the behavior modification index. This information includes, for example, in some embodiments, information regarding impulse purchases, spending categories, budget thresholds, specific merchants and/or categories of merchants, view points of similar or peer customers and the like. These various information types educate the system 502 regarding the customer's preferred behavior modification. For example, in one instance, a customer desires to stop making purchases online. Thus, in this step, the customer inputs information to the system 502 indicating that specific categories of merchants, that is in this case, online merchants are considered undesired merchants. This information is stored in the behavior modification index for later retrieval and application during an assessment of the likelihood of the customer's vulnerability to undesired financial behavior (see step 430 discussed below). As another example, in another instance a customer desires to purchase only when the customer's physiological activity is below a certain threshold. For example, the customer never wants to make a purchase when the purchaser's heart rate is over 100 beats per minute. The customer inputs this information into the system 502 thereby establishing a threshold. In some embodiments, when the behavior modification index is retrieved and applied during assessment, in the present example when the customer's heart rate rises above 100 beats per minute, as indicated by the customer data collection system 572A, the server alerting system 576B instructs the customer alerting system 576A to produce an alert indicating the to customer his or her vulnerability to undesired financial behavior. In another example, the customer inputs information related to electrodermal activity data. Specifically, in one example, the customer indicates that he or she wants the system 502 to alert the customer when his or her electrodermal activity rises above what is generally considered a normal threshold. That is, the customer indicates the he or she wants the system 502 to rely on an average threshold or predetermined threshold of electrodermal activity when assessing the customer's likelihoods of undesired financial behavior.

Similarly, in another instance, the customer indicates to the system that he or she wants the system 502 to assess the customer's likelihood of undesired financial behavior based only on the historically correlated and distilled excited behavior pattern matching large purchases, for example, purchases over $500.00. In such a case, for example, the system 502 may have gone through an extended training period, of, for example, one year, and the customer may be confident in his or her ability to discern purchases under $500.00, but, perhaps, the customer would prefer to be alerted to any heightened vulnerability to undesired financial behavior when the amount of money at risk is larger, in this case $500.00. The system 502 then, based on the information stored in the behavior modification index, when assessing the customer's vulnerability, only alerts the customer when the system 502, based on the historically correlated data and distilled patterns, determines that the customer is considering making a large purchase. In such a case, during the training period, the customer may have indicated to the training system when the customer made a large purchase, and the training system, when correlating the historical data, retained and correlated the data regarding the amounts of the purchases as well as the corresponding other historical data, such as historical physiological data. Then the training system could distill an excited behavior pattern indicating the combinations of historical data indicating a vulnerability to undesired financial behavior, that is, making large purchases, such as over $500.00.

As represented by block 320, the next step is to receive information from the customer establishing a process for rewarding positive behavior modification. For example, in one embodiment, a points-based system is configured to display a goal and point earned towards reaching the goal. As another example, in another embodiment, a game-based system is configured to interact with the customer to achieve a specific goal, and once the goal is achieved, the customer has "won the game," thereby achieving the reward. Information received from the customer includes, in some embodiments, selecting the reward. For example, in some embodiments, the customer indicates that the goal and the reward are related, such as the goal being to refrain from purchases when the customer's current physiological data indicates a high vulnerability to undesired purchases of expensive items, as defined by the customer. In some embodiments, the customer indicates that the reward for achieving this goal over a particular period of time is actually to make an expensive purchase. Thus, in a sense, this reward system encourages the customer to save funds, that is, without making another large purchase, for a predetermined period of time, and subsequently rewards the customer by allowing the purchase. In some embodiments, the system 502 alerts the customer regarding the goal of the process being reached, for example, the server alerting system 576B instructs the customer alerting system 576A to produce an alert indicating to the customer that the goal has been reached and the reward achieved.

In such a case, the subsequent large purchase or other reward, may have otherwise triggered an assessment that the customer was about to or has already participated in undesired financial activity; however, in some embodiments, the system 502 recognizes that the customer has achieved a reward and suspends alerting the customer of his or her vulnerability to undesired behavior for that particular instance of financial activity. Thereafter, in some embodiments, the system 502 resumes normal operation and alerts the customer regarding subsequent vulnerability to undesired behavior.

As represented by block 330, the next step is to receive information from the customer defining one or more output mechanisms for alerting the customer in the event of vulnerability. For example, in some embodiments, the customer indicates a desire to have an electronic notification sent to someone upon an assessment of vulnerability. Such electronic notice, in some such embodiments, is sent to the customer, in some such embodiments, it is sent to one or more other people such as friends and/or family. In some such embodiments, where the customer is an employee, and perhaps carries an employer-issued credit card, the employer defines the settings of the system and indicates that a notification should be send anytime the employee's behavior indicates he or she is vulnerable. In various other embodiments, other schemes of accountability involving one or more accountability partners are implemented based on the settings defined by the customer or someone with authority over the customer, such as in an employee/employer relationship as discussed above, a parent/child relationship, an adult child/older parent relationship and the like. In other embodiments, the output mechanism settings input from the customer include settings configured to implement other electronic communications such as email, SMS messaging, automated phone call, customer-defined audio alerting, customer-defined visual alerting such as changing color of a display wherein the customer behavior modification system includes or is a mobile device, customer-defined audio-visual alerting, and the like.

As represented by block 340, the next is to receive information from the customer defining communication settings, such as settings for communications between the server behavior modification system 502B and the customer behavior modification system 502A. For example, in some embodiments, the information defines settings for the server behavior modification system 502B to communicate with a mobile device such as a pager, a wireless fidelity device or wirelessly-enabled device, such as a laptop, smartphone, cellular phone and the like, a Bluetooth-enabled device, a Near Field Communication-enabled device, an RFID device, a wristband or other wearable article having processing capabilities, and the like.

The various information receiving steps, that is, 310, 320, 330, and/or 340 are performed, in some embodiments, by the customer data collection system 552A of the customer behavior modification system 502A and by the server data collection system 552B of the server behavior modification system 502B in others. In some embodiments, the customer data collection system 552A is coupled with the server data collection system 552B such that the server data collection system 552B, which includes a processor such as processor 512B instructs the customer data collection system 552A to collect the customer information. In some embodiments, the customer data collection system 552A includes one or more I/O devices 524 and in other embodiments, the customer data collection system 552A is coupled with one or more external external I/O devices 524 for collecting the customer information defining the settings.

As represented by block 350, the next step is to store the received information. The information is stored, in some embodiments, at a memory device 516A of the customer behavior modification system 502A, and in other embodiments at a memory device 516B of the server behavior modification system 502B. In other embodiments, the information is stored in both and in other embodiments pieces of the information are stored in one or the other memory device 516A or 516B.

Referring now to FIG. 4, a flowchart illustrates a method 130, originally presented as block 130 in FIG. 1, for assisting the customer to modify behavior during a financial activity according to embodiments of the present invention. In some embodiments, the assistance is based at least in part on some or all of the stored customer defined settings and the physiological activity of the customer. For example, in some embodiments, the system assesses the vulnerability of the customer to undesired financial behavior using the physiological activity data, and in some embodiments, other data such as global positioning data and/or temporal data. The current financial activity assistance system 570, which in various embodiments includes one or both of the customer current financial activity assistance system 570A and/or the server current financial activity assistance system 570B, performs some or all the steps of method 130.

As represented by block 410, the first step is to collect current global positioning data, current physiological data, and current temporal data. As discussed above, in various embodiments, different types of data are used by the system to assist the customer. In some embodiments, only current physiological data is collected and used in the assessment of step 430 discussed below. In other embodiments, only current physiological data and current global positioning data are collected and used in the assessment. In yet other embodiments, only current physiological activity data and current temporal data are collected and used in the assessment. In some embodiments, the customer current financial activity assistance system 570A performs step 410. Specifically, in some embodiments, the customer data collection system 572A collects the current data.

As represented by block 420, the next step is to combine the current physiological activity data, global positioning data, and/or temporal data, thereby establishing a combined current behavior pattern. The combined current behavior pattern potentially indicates a vulnerability of the customer to undesired financial behavior. In one embodiment, for example, the current physiological activity data is combined or correlated with current global positioning data and temporal data thereby establishing one or more data points, variables or inputs for a use input into a pre-established relational equation in order to determine a vulnerability index, level or value. In some embodiments, a current behavior algorithm or relational equation is derived relating the input variables, such as in step 260 of FIG. 2. One example of an equation relating the variables, which are a physiological activity data point, a global positioning data point, and a temporal data point, is as follows:

$$\alpha(\text{physiological activity data point}) + \beta(\text{global positioning data point}) + \gamma(\text{temporal data point}) = \text{vulnerability level},$$

wherein $\alpha$, $\beta$, and $\gamma$ are constants derived during the correlation of the historical data in step 260.

In various embodiments, the data points are standardized and/or conditioned before input into a relational equation. In some embodiments, for example, combinations of temporal data may be used to determine the temporal data point to input into the equation. In other embodiments, multiple physiological activity data points are included, in some multiple global positioning data points are included and in some multiple temporal data points are included. In some embodiments, the variables are weighted based on the customer input settings and/or based on historical determinations and/or standards regarding importance of particular variables in calculating a vulnerability level.

The relational equation, in some embodiments, was derived during the training period and is based on the distilled baseline behavior pattern and excited behavior pattern. In some embodiments, a relational equation is determined immediately before applying the relational equation to the current data. For example, in one embodiment, the baseline behavior pattern, the excited behavior pattern, or both are retrieved and one or more relational equations are derived from the patterns for application to the current data.

As represented by block 430, the next step is to assess the likelihood of the customer's vulnerability to undesired financial behavior. In some embodiments, for example, the assessment is based at least in part on the stored customer information and a comparison between the combined current behavior pattern and the combined historical behavior pattern. In one embodiment, for example, the excited behavior pattern is compared with the current behavior pattern in order to determine whether the combination of data points in the current behavior pattern is similar to the combination of data points in the excited behavior pattern.

In some embodiments, the current data, which is either in the form of a combined current behavior pattern, which in some embodiments, includes multiple data points progressing through time, thereby potentially indicates trends in the data. In some embodiments, the current data is input into the one or more derived relational equations thereby producing one or more vulnerability levels. Such vulnerability levels can be calculated in real time as current data is collected and therefore, trends in the vulnerability level can potentially indicate future vulnerabilities not yet attained. For example, in one embodiment, vulnerability levels are trending upward towards a high level, and the system 502 sends the customer a pre-emptive alert indicating to the customer that the vulnerability levels are trending higher. This may provide the customer an opportunity to stop the upward trend or reduce the vulnerability levels, for example, by relocating or perhaps by some sort of physiological remedy such as deep breathing.

In some embodiments, the data manipulation system 574 of the current financial activity assistance system 570 performs steps 420 and 430. In some such embodiments, the customer data manipulation system 574A, in some embodiments the server data manipulation system 574B, and in some embodiments both the customer and the server data manipulation systems 574A and 574B perform one or both of steps 420 and 430. Either one or both data manipulation system 574A and 574B include a processor, such as processor 512A or processor 512B, respectively, for performing the steps 420 and/or 430.

As represented by block 440, the next step is to produce an alert based at least in part on the stored customer information in the event of an assessment of likely vulnerability to undesired financial behavior. In some embodiments, for example, the server alerting system 576B instructs the customer alerting system 576A to produce the alert. In various embodiments, the alert includes one or more of an audible alert, a visual alert, an audio-visual alert, a vibratory alert, or some other type of alert. In some embodiments, the customer behavior modification system is or includes a mobile device as discussed above, and the alert is produced by the mobile device. For example, in one embodiment, the customer behavior modification system 502A is a mobile device, such as a smart phone having a display, and the server alerting system 576B wirelessly communicates instructions to the processor of the smart phone to alert the customer using a colored display, and in some embodiments, one or more text messages for display on the smart phone indicating the nature of the alert. In other embodiments, the customer alerting system 576A is coupled with the data manipulation system, either 574A or 574B and receives either instructions to produce an alert or data related to the vulnerability level or trend in the vulnerability level. In such embodiments, the customer alerting system 576A is configured to analyze the vulnerability level and determine the appropriate alert, if any.

As represented by block 450, the next step is to store the assessment of likely vulnerability to undesired financial behavior and, in some embodiments, the customer action taken with regard to any alert produced for the customer. In some embodiments, the vulnerability level or levels are stored, and in some embodiments, other data is stored. In some embodiments, the stored assessment is used for subsequent analysis and in some cases continued training of the system and continued behavior modification for the customer. For example, if the customer acted against an alert of the system, the system may be configured to communicate a message to one or more accountability partners of the customer, or in other embodiments, to the customer's superior.

Referring now to FIG. 5A a block diagram illustrates a behavior modification system environment 500 according to embodiments of the present invention. A customer behavior modification system 502A communicates over a network 506, such as the Internet and/or one or more intranets, with a server behavior modification system 502B. The customer behavior modification system 502A also communicates with one or more sensors, such as physiological sensor 508, which is configured for physiological communication with the customer 510. The one or more physiological sensors, in various embodiments, include one or more electrodermal sensors, one or more heart rate sensors, one or more blood pressure sensors, and the like. The customer behavior modification system 502A, in the embodiment shown includes a processor 512A configure to execute computer readable program code stored in the file system 516A, which in some embodiments is a memory device. The file system is configured for storing an operating system 520, a browser in some embodiments, and one or more applications 518A including program code configured to perform some or all of the steps discussed above with regard to methods 100, 110, 120, and 130. The processor is also coupled with a communication device 514A configured to communication across the network 506 with the server communication device 514B just as the server communication device 514B is likewise configured to communicate across the network with the customer communication device 514A. In some embodiments, the customer behavior modification system 502A is or is part of a customer device configured to communicate either directly with or over a network 506 with a point of sale terminal 530. In some embodiments, the point of sale terminal 530 is a "brick and mortar" terminal and in other embodiments it is a virtual terminal such as an online marketplace. In some embodiments, the customer behavior modification system is further configured for making payment during a transaction with the point of sale terminal as discussed in U.S. patent application Ser. No. 12/846,573, titled "Wearable Article Having Point of Sale Payment Functionality", to Naelon and filed concurrently herewith, and in yet other embodiments, the customer behavior modification system is further configured for indicating to the customer a financial indicator as discussed in U.S. patent application Ser. No. 12/846,576, titled "Wearable Financial Indicator", to Ross et al. and filed concurrently herewith. In various embodiments, the customer behavior modification system 502A also includes one or more devices configured for alerting the customer, such as, for example, display 526A, speaker 526B, and vibrator 526C. Further, in various embodiments, the customer behavior modification system 502A includes one or more input and/or output devices such as a keyboard, pointing device, disk drive and the like, collectively referred to herein as I/O device(s) 524. The server behavior modification system 502B includes a processor 512B configured to control the communication device 514B and execute computer readable program code stored in the file system 516B, such as a memory device. In some embodiments, one or more applications include program code for performing some or all the steps or steps similar to those discussed above with reference to methods 100, 110, 120, and/or 130.

Referring now to FIG. 5B, a block diagram illustrates a customer behavior modification system 502A according to embodiments of the present invention. In various embodiments the customer behavior modification system 502A includes one or more sub-systems, such as, for example, a customer training system 550A, a customer settings definition system 560A, and a customer current financial activity assistance system 570A, which in turn, in some embodiments, include one or more additional sub-systems. In the various embodiments, the one or more systems and sub-systems included in the customer behavior modification system 502A may share components. For example, in some embodiments, some or all of the systems and sub-systems include the processor 512A, and in some embodiments, some or all the systems and sub-systems include the file system 516A or a portion of the file system 516A. In various embodiments, each of the systems and sub-systems are configured to execute computer readable program code stored on a memory device, such as the file system 516A. In various embodiments, the systems and sub-systems include one or more of the other components discussed with reference to FIG. 5A above. Thus, in various embodiments, some or all the system and/or sub-systems include hardware components, and in various other embodiments, some or all the systems and/or sub-systems include both hardware and software components, the software components generally including computer readable program code configured for execution on a processor, which is generally included in the system and/or sub-system's hardware components.

The customer training system 550A, in some embodiments, is configured to store computer readable program code embodying instructions for executing one or more of the steps of method 110 of FIG. 1 and FIG. 2, similar steps, and/or other steps disclosed herein and also includes a processor for executing the one or more steps, similar steps, and/or other steps disclosed herein.

The customer data collection system 552A of the customer training system 550A, in some embodiments, is configured to store computer readable program code embodying instructions for executing one or more of steps 210, 220, 230, and 240 of FIG. 2, steps 310, 320, 330, and 340 of FIG. 3, and step 410 of FIG. 4, similar steps, and/or other steps disclosed herein and also includes a processor for executing the one or more steps, similar steps, and/or other steps disclosed herein.

The customer data manipulation system 554A of the customer training system 550A, in some embodiments, is configured to store computer readable program code embodying instructions for executing one or more of steps 250 and 260 of FIGS. 2 and 420, 430, and 440 of FIG. 4, similar steps, and/or other steps disclosed herein and also includes a processor for executing the one or more steps, similar steps, and/or other steps disclosed herein.

The customer settings definition system 560A, in some embodiments, is configured to store computer readable program code embodying instructions for executing one or more of the steps of method 120 of FIG. 1 and FIG. 3, similar steps, and/or other steps disclosed herein and also includes a processor for executing the one or more steps, similar steps, and/or other steps disclosed herein.

The customer information receiving system 562A, in some embodiments, is configured to store computer readable program code embodying instructions for executing one or more of steps 310, 320, 330, and 340 of FIG. 3, similar steps, and/or other steps disclosed herein and also includes a processor for executing the one or more steps, similar steps, and/or other steps disclosed herein.

The customer information storing system 564A, in some embodiments, is configured to store computer readable program code embodying instructions for executing one or more of steps 310, 320, 330, and 340 of FIG. 3, similar steps, and/or other steps disclosed herein and also includes a processor for executing the one or more steps, similar steps, and/or other steps disclosed herein.

The customer current financial activity assistance system 570A, in some embodiments, is configured to store computer readable program code embodying instructions for executing one or more of the steps of method 130 of FIG. 1 and FIG. 4, similar steps, and/or other steps disclosed herein and also includes a processor for executing the one or more steps, similar steps, and/or other steps disclosed herein.

The customer data collection system 572A, in some embodiments, is configured to store computer readable program code embodying instructions for executing step 410 of FIG. 4, similar steps, and/or other steps disclosed herein and also includes a processor for executing the step, similar steps, and/or other steps disclosed herein.

The customer data manipulation system 574A, in some embodiments, is configured to store computer readable program code embodying instructions for executing of step 440 of FIG. 4, similar steps, and/or other steps disclosed herein and also includes a processor for executing the step, similar steps, and/or other steps disclosed herein.

The customer alerting system 576A, in some embodiments, is configured to store computer readable program code embodying instructions for executing step 440 of FIG. 4, similar steps, and/or other steps disclosed herein and also includes a processor for executing the step, similar steps, and/or other steps disclosed herein.

The customer information storing system 578A, in some embodiments, is configured to store computer readable program code embodying instructions for executing step 440 of FIG. 4, similar steps, and/or other steps disclosed herein and also includes a processor for executing the step, similar steps, and/or other steps disclosed herein.

Referring now to FIG. 5C, a block diagram illustrates a server behavior modification system 502B according to embodiments of the present invention. In various embodiments the server behavior modification system 502B includes one or more sub-systems, such as, for example, a server training system 550B, a server settings definition system 560B, and a server current financial activity assistance system 570B, which in turn, in some embodiments, include one or more additional sub-systems. In the various embodiments, the one or more systems and sub-systems included in the server behavior modification system 502B may share components. For example, in some embodiments, some or all of the systems and sub-systems include the processor 512B, and in some embodiments, some or all the systems and sub-systems include the file system 516B or a portion of the file system 516B or the computer readable program code stored at the file system 516B. In various embodiments, each of the systems and sub-systems are configured to execute computer readable program code stored on a memory device, such as the file system 516B. In various embodiments, the systems and sub-systems include one or more of the other components discussed with reference to FIG. 5A above. Thus, in various embodiments, some or all the system and/or sub-systems include hardware components, and in various other embodiments, some or all the systems and/or sub-systems include both hardware and software components, the software components generally including computer readable program code configured for execution on a processor, which is generally included in the system and/or sub-system's hardware components.

The server training system 550B, in some embodiments, is configured to store computer readable program code embodying instructions for executing one or more of the steps of method 110 of FIG. 1 and FIG. 2, similar steps, and/or other steps disclosed herein and also includes a processor for executing the one or more steps, similar steps, and/or other steps disclosed herein.

The server data collection system 552B of the server training system 550B, in some embodiments, is configured to store computer readable program code embodying instructions for executing one or more of steps 210, 220, 230, and 240 of FIG. 2, steps 310, 320, 330, and 340 of FIG. 3, and step 410 of FIG. 4, similar steps, and/or other steps disclosed herein and also includes a processor for executing the one or more steps, similar steps, and/or other steps disclosed herein.

The server data manipulation system 554B of the server training system 550B, in some embodiments, is configured to store computer readable program code embodying instructions for executing one or more of steps 250 and 260 of FIGS. 2 and 420, 430, and 440 of FIG. 4, similar steps, and/or other steps disclosed herein and also includes a processor for executing the one or more steps, similar steps, and/or other steps disclosed herein.

The server settings definition system 560B, in some embodiments, is configured to store computer readable program code embodying instructions for executing one or more of the steps of method 120 of FIG. 1 and FIG. 3, similar steps, and/or other steps disclosed herein and also includes a processor for executing the one or more steps, similar steps, and/or other steps disclosed herein.

The server information receiving system 562B, in some embodiments, is configured to store computer readable program code embodying instructions for executing one or more of steps 310, 320, 330, and 340 of FIG. 3, similar steps, and/or other steps disclosed herein and also includes a processor for executing the one or more steps, similar steps, and/or other steps disclosed herein.

The server information storing system 564B, in some embodiments, is configured to store computer readable program code embodying instructions for executing one or more of steps 310, 320, 330, and 340 of FIG. 3, similar steps, and/or other steps disclosed herein and also includes a processor for executing the one or more steps, similar steps, and/or other steps disclosed herein.

The server current financial activity assistance system 570B, in some embodiments, is configured to store computer readable program code embodying instructions for executing one or more of the steps of method 130 of FIG. 1 and FIG. 4, similar steps, and/or other steps disclosed herein and also includes a processor for executing the one or more steps, similar steps, and/or other steps disclosed herein.

The server data collection system 572B, in some embodiments, is configured to store computer readable program code embodying instructions for executing step 410 of FIG. 4, similar steps, and/or other steps disclosed herein and also includes a processor for executing the step, similar steps, and/or other steps disclosed herein.

The server data manipulation system 574B, in some embodiments, is configured to store computer readable program code embodying instructions for executing of step 440 of FIG. 4, similar steps, and/or other steps disclosed herein and also includes a processor for executing the step, similar steps, and/or other steps disclosed herein.

The server alerting system 576B, in some embodiments, is configured to store computer readable program code embodying instructions for executing step 440 of FIG. 4, similar steps, and/or other steps disclosed herein and also includes a processor for executing the step, similar steps, and/or other steps disclosed herein.

The server information storing system 578B, in some embodiments, is configured to store computer readable program code embodying instructions for executing step 440 of FIG. 4, similar steps, and/or other steps disclosed herein and also includes a processor for executing the step, similar steps, and/or other steps disclosed herein.

In various embodiments, the customer behavior modification system and the physiological sensor are collocated proximate the customer's person, and in other various embodiments, they are separate and distinct. In some embodiments, some or all the components discussed with regard to the customer behavior modification system are included a device wherein the physiological sensor is also included. In some embodiments, the mobile device servers as a mobile terminal for communicating with the sensor via a short distance wireless protocol such as near field communication, as well as with a server behavior modification system in some embodiments. In some embodiments, the customer behavior modification system includes an accelerometer or other motion detection device configured for recognizing motion of the customer and communicating.

In various embodiments, one or more of the systems discussed herein can also be used in conjunction with habitual behavior management, such as, but not limited to, gambling, financial goal attainment, over-eating, smoking, insomnia, sickness and the like.

In various embodiments, the one or more sensors is or includes other types of biosensors, such as, for example, voice pitch, tone, amplitude, frequency, specific word recognition, that is, speech emotion recognition and the like.

In various embodiments, before using the system, or as an interim updating step for the system, financial information or data is captured during an analysis of the customer's financial situation, such as during a meeting with a financial analyst and/or other financial coach.

In various embodiments, the customer behavior modification system and/or the server behavior modification system includes an application configured for gathering, storing and making available financial tracking information indicating, for example, when the customer made a purchase, when the customer is reviewing financial positions or the like, when the customer is making a payment on an account, such as a credit card account, when the customer is meeting with a financial advisor and the like. In some instances, the financial institution or other enterprise maintaining the behavior modification system requests surveys from the customers regarding their feelings at different times of the data, week or year. Such data is useful in corroborating the physiological data and, in some embodiments, the other data collected.

In various embodiments, the behavior modification system is configured to assist the customer attain financial goals. In various applications, the behavior modification system is used by charities, support groups, and/or peer groups in order for the individual members of those groups to assist one another toward goals.

In some embodiments, the behavior modification system communicates with the financial institution, such as with the server behavior modification system in order to enable suspension of specified account functionality, such as, for example, suspension of a credit or debit card account. In one embodiment, for example, the system enables a freeze period for purchases over a certain predetermined threshold. In some embodiments, the freeze is enabled in response to a particular, in some embodiments, a predetermined, level of physiological activity. In some embodiments, the system communicates with the customer in order to keep the customer apprised of their behavior. In some embodiments, the system tracks the customer's habitual behavior, such as, for example, compulsive eating, and when the customer's physiological state is excited, the system communicates, either over a short range wireless protocol or over a long range protocol, and in some embodiments, across the Internet. In one example, the customer overeats, and the system is configured to, upon a determined vulnerability, communicate with electronics embedded with the refrigerator, cabinets, and/or pantry in order to lock them, thereby providing a reasons for the customer to pause during a moment of weakness.

In various embodiments, the system is configured for providing a customer an opportunity to indicate a preference for specific services to be provided, such as, for example, medical services, legal services, accounting services, banking services, and the like.

Embodiments of the invention provide for methods, computer program products, customer behavior modification systems, and server behavior modification systems for assisting a customer during a financial activity, such as a transaction. The server behavior modification system includes a current financial activity assistance system having a data collection system for collecting current physiological activity data, such as current electrodermal activity data, and a data manipulation system for assessing the likelihood of vulnerability to a predetermined undesired financial behavior, as defined by customer input received by a customer settings definition system. The assessment is based at least in part on the data manipulation system comparing a combined historical behavior pattern with the collected current data. The combined historical behavior pattern comprises a correlation between historical physiological activity data and historical financial activity data. An alerting system instructs a customer behavior modification system to produce an alert based at least in part on an assessment of likely vulnerability to a predetermined undesired financial behavior.

Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As used herein, unless specifically limited by the context, the term "transaction" may refer to a purchase of goods and/or services (collectively referred to herein as "products"), a withdrawal of funds, an electronic transfer of funds, a payment transaction, a credit transaction, a PIN change transaction or other interaction between a cardholder and the bank maintained a bank account owned by the cardholder. As used herein, a "bank card" refers to a credit card, debit card, ATM card, check card, or the like, or other payment device such as, but not limited to, those discussed above that are not cards. An "account" or "bank account" refers to a credit account, debit account, deposit account, demand deposit account (DDA), checking account, budgeting account or the like. Although the phrases "bank card" and "bank account" include the term "bank," the card or payment device need not be issued by a bank, and the account need not be maintained by a bank and may instead be issued by and/or maintained by other financial institutions.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for assisting a customer considering a purchase of a product, the method comprising:
   establishing, by a processor of a current purchase activity assistance system, a combined historical behavior pattern comprising:
      receiving customer input indicating one or more historical instances when the customer made a purchase and subsequently considered the purchase an undesired purchase, the customer input stored as historical purchase activity data indicating predetermined undesired purchasing behavior;
      collecting and storing historical physiological activity data from the customer contemporaneously with the historical instances when the customer made a purchase subsequently considered an undesired purchase; and
      correlating the historical purchase activity data and the historical physiological activity data such that each undesired purchase is correlated to physiological activity indicative of future undesired purchasing behavior;
   processing, by the processor of the current purchase activity assistance system, data related to a customer's purchasing activity, the processing comprising:
      collecting, by a data collection system, current data, the collecting comprising:
         collecting, by the data collection system, current physiological activity data; and
      assessing, by a data manipulation system, the likelihood of vulnerability to a predetermined undesired purchasing behavior based at least in part on:
         comparing, by the data manipulation system, the combined historical behavior pattern indicative of future undesired purchasing behavior and corresponding to the customer with the collected current data; and
   assisting the customer considering a purchase of a product, the assisting comprising producing an alert, by an alerting system, based at least in part on the assessment of the likelihood of vulnerability to the predetermined undesired purchasing behavior.

2. The method of claim 1, wherein:
   the current financial activity assistance system comprises a server current financial activity assistance system; wherein:
   the data collection system comprises a processor configured for instructing a customer data collection system to:
      collect the current data comprising collecting the current physiological activity data; and wherein:
   the data manipulation system comprises a server data manipulation system.

3. The method of claim 1, wherein the financial activity comprises a transaction.

4. The method of claim 1, further comprising:
training, by a training system using artificial intelligence, the current purchase activity assistance system to assist the customer during the financial activity, the training comprising:
- collecting, by the data collection system, historical data comprising the historical physiological activity data and the historical financial activity data;
- correlating, by the data manipulation system, the historical physiological activity data and the historical financial activity data; and
- distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

5. The method of claim 4, further comprising:
storing, by the information storing system, the data regarding assessment of likely vulnerability to the predetermined undesired financial behavior and data regarding the customer action in response to the assessment; and wherein:
training, by a training system using artificial intelligence, the current purchase activity assistance system to assist the customer during the financial activity further comprises:
- adding, by the data manipulation system, the current physiological activity data to the historical physiological activity data;
- adding, by the data manipulation system, the data regarding the customer action in response to the assessment to the historical financial activity data;
- re-correlating, by the data manipulation system, the historical physiological activity data and the historical financial activity data; and
- re-distilling, by the data manipulation system, the baseline behavior pattern and the excited behavior pattern from the collected and re-correlated historical data.

6. The method of claim 1, further comprising:
training, by a training system using artificial intelligence, the current purchase activity assistance system to assist the customer during the financial activity, the training comprising:
- collecting, by the data collection system, historical data comprising the historical physiological activity data, historical global positioning data, and the historical financial activity data;
- combining, by the data manipulation system, the historical physiological activity data and the historical global positioning data, thereby establishing the combined historical behavior pattern;
- correlating, by the data manipulation system, the combined historical behavior pattern and the historical financial activity data; and
- distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

7. The method of claim 1, further comprising:
training, by a training system using artificial intelligence, the current purchase activity assistance system to assist the customer during the financial activity, the training comprising:
- collecting, by the data collection system, historical data comprising the historical physiological activity data, historical temporal data, and the historical financial activity data;
- combining, by the data manipulation system, the historical physiological activity data and the historical temporal data, thereby establishing the combined historical behavior pattern;
- correlating, by the data manipulation system, the combined historical behavior pattern and the historical financial activity data; and
- distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

8. The method of claim 1, further comprising:
training, by a training system using artificial intelligence, the current purchase activity assistance system to assist the customer during the financial activity, the training comprising:
- collecting, by the data collection system, historical data comprising the historical physiological activity data, historical global positioning data, historical temporal data, and the historical financial activity data;
- combining, by the data manipulation system, the historical physiological activity data, the historical global positioning data, and the historical temporal data, thereby establishing the combined historical behavior pattern;
- correlating, by the data manipulation system, the combined historical behavior pattern and the historical financial activity data; and
- distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

9. The method of claim 1, wherein the alerting system comprises a processor configured for instructing the customer alerting system to produce an alert based at least in part on the assessment of the likelihood of vulnerability to the predetermined undesired financial behavior.

10. The method of claim 1, further comprising:
defining, by a settings definition system, settings comprising:
- receiving information from the customer defining a behavior modification index, the information comprising information defining one or more predetermined undesired financial behaviors; and wherein:

assessing the likelihood of vulnerability to a predetermined undesired financial behavior further comprises:
accessing, by the data manipulation system, the information defining the one or more predetermined undesired financial behaviors.

11. The method of claim 10, wherein the information received from the customer defining the behavior modification index comprises information defining one or more spending categories, one or more budget thresholds, one or more specific merchants, one or more categories of merchants, or one or more viewpoints regarding peer customers, and wherein:
assessing the likelihood of vulnerability to the predetermined undesired financial behavior further comprises:
accessing, by the data manipulation system, the behavior modification index; and wherein:
assessing the likelihood of vulnerability to the predetermined undesired financial behavior is further based at least in part on the accessed behavior modification index.

12. The method of claim 1, further comprising:
defining, by a settings definition system, settings comprising:
receiving information from the customer establishing a process for rewarding positive behavior modification, the process comprising:
setting a goal and a reward to be given the customer upon reaching the goal.

13. The method of claim 2, further comprising:
defining, by a settings definition system, settings comprising:
receiving information from the customer defining one or more alert output mechanisms, and wherein:
producing an alert based at least in part on the assessment of the likelihood of vulnerability to the predetermined undesired financial behavior is further based at least in part on the one or more alert output mechanisms.

14. The method of claim 1, further comprising:
defining, by a settings definition system, settings comprising:
receiving information from the customer defining one or more communication settings, and wherein:
producing an alert based at least in part on the assessment of the likelihood of vulnerability to the predetermined undesired financial behavior is further based at least in part on the one or more communication settings.

15. The method of claim 1, further comprising:
storing, by an information storing system, the assessment of likely vulnerability to the predetermined undesired financial behavior and the customer action in response to the assessment.

16. The method of claim 1, wherein:
the current physiological activity data comprises electrodermal activity data;
the historical physiological activity data comprises historical electrodermal activity data; and
the data collection system comprises a processor configured for receiving an electrodermal activity signal from a customer data collection system comprising one or more electrodermal sensors in physiological communication with the customer.

17. The method of claim 1, wherein:
the current physiological activity data comprises blood pressure data;
the historical physiological activity data comprises historical blood pressure data; and
the data collection system comprises a processor configured for receiving a blood pressure signal from a customer data collection system comprising one or more blood pressure sensors in physiological communication with the customer.

18. The method of claim 1, wherein:
the current physiological activity data comprises heart rate data;
the historical physiological activity data comprises historical heart rate activity data; and
the data collection system comprises a processor configured for receiving a heart rate activity signal from a customer data collection system comprising one or more heart rate sensors in physiological communication with the customer.

19. The method of claim 1, wherein:
the current physiological activity data comprises blood sugar data;
the historical physiological activity data comprises historical blood sugar data; and
the data collection system comprises a processor configured for receiving an blood sugar signal from a customer data collection system comprising one or more blood sugar sensors in physiological communication with the customer.

20. A system for assisting a customer considering a purchase of a product, the system comprising:
a current purchase activity assistance system comprising a processor to:
establish a combined historical behavior pattern by:
receive customer input indicating one or more historical instances when the customer made a purchase and subsequently considered the purchase an undesired purchase, the customer input stored as historical purchase activity data indicating predetermined undesired purchasing behavior;
collect and storing historical physiological activity data from the customer contemporaneously with the historical instances when the customer made a purchase subsequently considered an undesired purchase; and
correlate the historical purchase activity data and the historical physiological activity data such that each undesired purchase is correlated to physiological activity indicative of future undesired purchasing behavior;
a data collection system comprising a processor to:
collect current data, the collecting comprising:
collecting current physiological activity data; and
a data manipulation system comprising a processor to assess the likelihood of vulnerability to a predetermined undesired purchasing behavior based at least in part on:
comparing the combined historical behavior pattern indicative of future undesired purchasing behavior and corresponding to the customer with the collected current data; and
an alerting system to assist the customer considering a purchase of a product, the assisting comprising producing an alert based at least in part on the assessment of the likelihood of vulnerability to the predetermined undesired purchasing behavior.

21. The system of claim 20, wherein:
the current financial activity assistance system comprises a server current financial activity assistance system; wherein:
the data collection system comprises a processor configured for instructing a customer data collection system to:

collect the current data comprising collecting the current physiological activity data; and wherein:
the data manipulation system comprises a server data manipulation system.

22. The system of claim 20, wherein the financial activity comprises a transaction.

23. The system of claim 20, wherein the current financial activity assistance system further comprises:
a training system to assist the customer during the financial activity, the training system comprising a data collection system and a data manipulation system, the data collection system comprising a processor to:
collect historical data comprising the historical physiological activity data and the historical financial activity data, the data manipulation system configured for:
correlate the historical physiological activity data and the historical financial activity data; and
distill at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

24. The system of claim 23, further comprising:
an information storing system to store the data regarding assessment of likely vulnerability to the predetermined undesired financial behavior and data regarding the customer action in response to the assessment; and wherein the processor of the data manipulation system is further to:
add the current physiological activity data to the historical physiological activity data;
add the data regarding the customer action in response to the assessment to the historical financial activity data;
re-correlate the historical physiological activity data and the historical financial activity data; and
re-distill the baseline behavior pattern and the excited behavior pattern from the collected and re-correlated historical data.

25. The system of claim 20, wherein the current financial activity assistance system further comprises:
a training system configured to assist the customer during the financial activity, the training system comprising a data collection system and a data manipulation system, the data collection system comprising a processor to:
collect historical data, the historical data comprising the historical physiological activity data, historical global positioning data, and the historical financial activity data, the data manipulation system configured for:
combine the historical physiological activity data and the historical global positioning data, thereby establishing the combined historical behavior pattern;
correlate the combined historical behavior pattern and the historical financial activity data; and
distill at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

26. The system of claim 20, wherein the current financial activity assistance system further comprises:
a training system to assist the customer during the financial activity, the training system comprising a data collection system and a data manipulation system, the data collection system comprising a processor to:
collect historical data comprising the historical physiological activity data, historical temporal data, and the historical financial activity data; the data manipulation system configured for:
combine the historical physiological activity data and the historical temporal data, thereby establishing the combined historical behavior pattern;
correlate the combined historical behavior pattern and the historical financial activity data; and
distill at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

27. The system of claim 20, wherein the current financial activity assistance system further comprises:
a training system to assist the customer during the financial activity, the training system comprising a data collection system and a data manipulation system, the data collection system comprising a processor to:
collect historical data comprising the historical physiological activity data, historical global positioning data, historical temporal data, and the historical financial activity data; the data manipulation system configured for:
combine the historical physiological activity data, the historical global positioning data, and the historical temporal data, thereby establishing the combined historical behavior pattern;
correlate the combined historical behavior pattern and the historical financial activity data; and
distill at least a baseline behavior pattern and an excited behavior pattern from the collected and correlated historical data, the baseline behavior pattern comprising combinations of historical data tending to indicate a low likelihood of vulnerability to the predetermined undesired financial behavior and the excited behavior pattern comprising combinations of historical data tending to indicate a high likelihood of vulnerability to the predetermined undesired financial behavior.

28. The system of claim 20, further comprising:
a settings definition system comprising a processor to define settings comprising receiving information from the customer defining a behavior modification index, the information comprising information defining one or more predetermined undesired financial behaviors; and wherein the processor of the data manipulation system is further to:
access the information defining the one or more predetermined undesired purchasing behaviors.

29. The system of claim 28, wherein the information received from the customer defining the behavior modification index comprises information defining one or more spending categories, one or more budget thresholds, one or more specific merchants, one or more categories of merchants, or one or more viewpoints regarding peer customers, and wherein the processor of the data manipulation system is further to:
- access the behavior modification index; and
- assess the likelihood of vulnerability to the predetermined undesired financial behavior is further based at least in part on the accessed behavior modification index.

30. The system of claim 20, further comprising:
a settings definition system comprising a processor to define settings comprising receiving information from the customer establishing a process for rewarding positive behavior modification, the process comprising:
setting a goal and a reward to be given the customer upon reaching the goal.

31. The system of claim 20, wherein the processor of the alerting system is further to:
define settings comprising receiving information from the customer defining one or more alert output mechanisms, and
produce an alert based at least in part on the assessment of the likelihood of vulnerability to the predetermined undesired financial behavior and further based at least in part on the one or more alert output mechanisms.

32. The system of claim 20, wherein the processor of the alerting system is further to:
define settings comprising receiving information from the customer defining one or more alert output mechanisms, and
produce an alert based at least in part on the assessment of the likelihood of vulnerability to the predetermined undesired financial behavior and further based at least in part on the one or more communication settings.

33. The system of claim 20, further comprising:
an information storing system to store the assessment of likely vulnerability to the predetermined undesired financial behavior and the customer action in response to the assessment.

34. The system of claim 20, wherein:
the current physiological activity data comprises electrodermal activity data;
the historical physiological activity data comprises historical electrodermal activity data; and wherein:
the processor of the data collection system is further to:
receive an electrodermal activity signal from a customer data collection system comprising one or more electrodermal sensors in physiological communication with the customer.

35. The system of claim 20, wherein:
the current physiological activity data comprises blood pressure data;
the historical physiological activity data comprises historical blood pressure data; and wherein
the processor of the data collection system is further to:
receive a blood pressure signal from a customer data collection system comprising one or more blood pressure sensors in physiological communication with the customer.

36. The system of claim 20, wherein:
the current physiological activity data comprises heart rate data;
the historical physiological activity data comprises historical heart rate activity data; and wherein
the processor of the data collection system is further to:
receive a heart rate activity signal from a customer data collection system comprising one or more heart rate sensors in physiological communication with the customer.

37. The system of claim 20, wherein:
the current physiological activity data comprises blood sugar data;
the historical physiological activity data comprises historical blood sugar data; and wherein
the processor of the data collection system is further to:
receive a blood sugar signal from a customer data collection system comprising one or more blood sugar sensors in physiological communication with the customer.

38. A computer program product comprising a non-transitory computer-readable medium comprising computer-readable instructions for execution by a purchase activity assistance system, the instructions configured for assisting a customer considering a purchase of a product, the instructions comprising:
instructions for establishing a combined historical behavior pattern by:
receiving customer input indicating one or more historical instances when the customer made a purchase and subsequently considered the purchase an undesired purchase, the customer input stored as historical purchase activity data indicating predetermined undesired purchasing behavior;
collecting and storing historical physiological activity data from the customer contemporaneously with the historical instances when the customer made a purchase subsequently considered an undesired purchase; and
correlating the historical purchase activity data and the historical physiological activity data such that each undesired purchase is correlated to physiological activity indicative of future undesired purchasing behavior;
instructions for collecting, by a data collection system, current data, the instructions for collecting comprising:
instructions for collecting, by the data collection system, current physiological activity data; and
instructions for assessing, by a data manipulation system, the likelihood of vulnerability to a predetermined undesired purchasing behavior based at least in part on:
instructions for comparing, by the data manipulation system, the combined historical behavior pattern indicative of future undesired purchasing behavior and corresponding to the customer with the collected current data; and
instructions for assisting the customer considering a purchase of a product, the assisting comprising producing an alert based at least in part on the assessment of the likelihood of vulnerability to the predetermined undesired purchasing behavior.

39. The computer program product of claim 38, wherein the instructions further comprise:
instructions for training, by a training system using artificial intelligence, the purchase activity assistance system to assist the customer during the financial activity, the instructions for training comprising:
instructions for collecting, by the data collection system, historical data comprising the historical physiological activity data and the historical purchase activity data;
instructions for correlating, by the data manipulation system, the historical physiological activity data and the historical purchase activity data; and
instructions for distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired purchasing behavior and the excited behavior pattern comprising combinations of historical data tending to indicate a high likelihood of vulnerability to the predetermined undesired purchasing behavior.

40. The computer program product of claim 39, wherein the instructions further comprise:
instructions for storing, by the information storing system, the data regarding assessment of likely vulnerability to the predetermined undesired purchasing behavior and data regarding the customer action in response to the assessment; and wherein:
the instructions for training further comprise:
instructions for adding, by the data manipulation system, the current physiological activity data to the historical physiological activity data;
instructions for adding, by the data manipulation system, the data regarding the customer action in response to the assessment to the historical purchasing activity data;
instructions for re-correlating, by the data manipulation system, the historical physiological activity data and the historical purchasing activity data; and
instructions for re-distilling, by the data manipulation system, the baseline behavior pattern and the excited behavior pattern from the collected and re-correlated historical data.

41. The computer program product of claim 38, wherein the instructions further comprise:
instructions for training, by a training system using artificial intelligence, the purchase activity assistance system, to assist the customer considering a purchase of a product, the training comprising:
instructions for collecting, by the data collection system, historical data comprising the historical physiological activity data, historical global positioning data, historical temporal data, and the historical purchase activity data;
instructions for combining, by the data manipulation system, the historical physiological activity data, the historical global positioning data, and the historical temporal data, thereby establishing a combined historical behavior pattern;
instructions for correlating, by the data manipulation system, the combined historical behavior pattern and the historical purchase activity data; and
instructions for distilling, by the data manipulation system, at least a baseline behavior pattern and an excited behavior pattern from the collected and correlated historical data, the baseline behavior pattern comprising combinations of historical data tending to indicate a low likelihood of vulnerability to the predetermined undesired purchasing behavior and the excited behavior pattern comprising combinations of historical data tending to indicate a high likelihood of vulnerability to the predetermined undesired purchasing behavior.

42. The computer program product of claim 38, wherein the instructions further comprise:
instructions for defining, by a settings definition system, settings comprising:
instructions for receiving information from the customer defining a purchase activity assistance index, the information comprising information defining one or more predetermined undesired purchasing behaviors; and wherein:
the instructions for assessing the likelihood of vulnerability to a predetermined undesired behavior further comprise:
instructions for accessing, by the data manipulation system, the information defining the one or more predetermined undesired purchasing behaviors.

43. The computer program product of claim 38, the instructions further comprising:
instructions for defining, by a settings definition system, settings comprising:
instructions for receiving information from the customer establishing a process for rewarding positive purchasing activity, the process comprising:
setting a goal and a reward to be given the customer upon reaching the goal.

44. The computer program product of claim 38, wherein:
the current physiological activity data comprises electrodermal activity data;
the historical physiological activity data comprises historical electrodermal activity data; and wherein the instructions further comprise:
instructions for receiving an electrodermal activity signal from a customer data collection system comprising one or more electrodermal sensors in physiological communication with the customer.

45. A method for assisting a customer considering a purchase of a product, the method comprising:
establishing, by a processor of a current purchase activity assistance system, a combined historical behavior pattern by:
receiving customer input indicating one or more historical instances when the customer made a purchase and subsequently considered the purchase an undesired purchase, the customer input stored as historical purchase activity data indicating predetermined undesired purchasing behavior;
collecting and storing historical physiological activity data from the customer contemporaneously with the historical instances when the customer made a purchase subsequently considered an undesired purchase;
correlating the historical purchase activity data and the historical physiological activity data such that each undesired purchase is correlated to physiological activity indicative of future undesired purchasing behavior;
processing, by the processor of the current purchase activity assistance system, data related to a customer's purchasing activity, the processing comprising:
collecting, by a data collection system, current data, the collecting comprising:
collecting, by the data collection system, current physiological activity data;
communicating, by a communication device, the current physiological activity data to a server purchase activity assistance system for assessment, by the server purchase activity assistance system, of the likelihood of vulnerability to a predetermined undesired purchasing behavior by comparing the combined historical behavior pattern indicative of future undesired purchasing behavior and corresponding to the customer with the collected current data;
receiving, by a customer alerting system, instructions for producing an alert based at least in part on the server purchase activity assistance system assessment of the likelihood of vulnerability to the predetermined undesired purchasing behavior; and producing an alert based at least in part on the received instructions.

46. The method of claim 45, further comprising:
collecting, by the data collection system, historical data comprising the historical physiological activity; and
communicating, by the communication device, the historical data to the server purchase activity assistance system for correlation of the historical physiological activity data and historical purchasing activity data and distilling at least a baseline behavior pattern and an excited behavior pattern from the collected and correlated historical data, the baseline behavior pattern comprising combinations of historical data tending to indicate a low likelihood of vulnerability to the predetermined undesired purchasing behavior and the excited behavior pattern comprising combinations of historical data tending to indicate a high likelihood of vulnerability to the predetermined undesired purchasing behavior.

47. The method of claim 46, wherein collecting the current physiological activity data comprises:
collecting, by an electrodermal sensor of the data collection system in physiological communication with the customer, electrodermal activity data, and wherein collecting historical data comprises:
collecting, by the electrodermal sensor, historical electrodermal activity data.

48. The method of claim 45, further comprising:
collecting, by the data collection system, historical data comprising the historical physiological activity data, historical global positioning data, and historical temporal data; and
communicating, by the communication device, the historical data to the server purchase activity assistance system for combining the historical physiological activity data, the historical global positioning data, and the historical temporal data, thereby establishing a combined historical behavior pattern, correlation of the combined historical behavior pattern and historical purchasing activity data, and distilling at least a baseline behavior pattern and an excited behavior pattern from the collected and correlated historical data, the baseline behavior pattern comprising combinations of historical data tending to indicate a low likelihood of vulnerability to the predetermined undesired purchasing behavior and the excited behavior pattern comprising combinations of historical data tending to indicate a high likelihood of vulnerability to the predetermined undesired purchasing behavior.

49. The method of claim 45, further comprising:
receiving information, by a customer information receiving system, defining a purchase activity assistance index, the information comprising information defining one or more predetermined undesired purchasing behaviors; and
communicating, by the communication device, the information to the server purchase activity assistance system.

50. A customer purchase activity assistance system configured for assisting a customer considering a purchase of a product, the system comprising:
a current purchase activity assistance system comprising a processor to:
establish a combined historical behavior pattern by:
receiving customer input indicating one or more historical instances when the customer made a purchase and subsequently considered the purchase an undesired purchase, the customer input stored as historical purchase activity data indicating predetermined undesired purchasing behavior;
collecting and storing historical physiological activity data from the customer contemporaneously with the historical instances when the customer made a purchase subsequently considered an undesired purchase; and
correlating the historical purchase activity data and the historical physiological activity data such that each undesired purchase is correlated to physiological activity indicative of future undesired purchasing behavior;
a data collection system comprising a processor to collect current data comprising current physiological activity data;
a communication device to communicate the current physiological activity data to a server purchase activity assistance system for assessment, by the server behavior modification system, of the likelihood of vulnerability to a predetermined undesired purchasing behavior by comparing the combined historical behavior pattern indicative of future undesired purchasing behavior and corresponding to the customer with the collected current data; and
a customer alerting system comprising a processor to:
receive instructions for producing an alert based at least in part on the server purchase activity assistance system assessment of the likelihood of vulnerability to the predetermined undesired purchasing behavior; and
produce an alert based at least in part on the received instructions.

51. The customer purchase activity assistance system of claim 50, wherein the data collection system is further to:
collect historical data comprising the historical physiological activity; and wherein the communication device is further configured for:
communicate the historical data to the server purchase activity assistance system for correlation of the historical physiological activity data and historical purchasing activity data and distilling at least a baseline behavior pattern and an excited behavior pattern from the collected and correlated historical data, the baseline behavior pattern comprising combinations of historical data tending to indicate a low likelihood of vulnerability to the predetermined undesired purchasing behavior and the excited behavior pattern comprising combinations of historical data tending to indicate a high likelihood of vulnerability to the predetermined undesired purchasing behavior.

52. The customer purchase activity assistance system of claim 51, wherein the data collection system comprises:
an electrodermal sensor in physiological communication with the customer, the electrodermal sensor configured for collecting the historical physiological activity data and the current physiological activity data, the historical physiological activity data comprising historical electrodermal activity data and the current physiological activity data comprising current electrodermal activity data.

53. The customer purchase activity assistance system of claim 50, wherein the data collection system is further to:
collect historical data comprising the historical physiological activity data, historical global positioning data, and historical temporal data; and wherein the communication device is further configured for:
communicate the historical data to the server purchase activity assistance system for combining the historical physiological activity data, the historical global positioning data, and the historical temporal data, thereby establishing a combined historical behavior pattern, correlation of the combined historical behavior pattern and historical purchasing activity data, and distilling at least a baseline behavior pattern and an excited behavior pattern from the collected and correlated historical data, the baseline behavior pattern comprising combinations of historical data tending to indicate a low likelihood of vulnerability to the predetermined undesired purchasing behavior and the excited behavior pattern comprising combinations of historical data tending to indicate a high likelihood of vulnerability to the predetermined undesired purchasing behavior.

54. The customer purchase activity assistance system of claim 50, further comprising:
a customer information receiving system comprising a processor to:
receive information defining a purchase activity assistance index, the information comprising information defining one or more predetermined undesired purchasing behaviors; and wherein the communication device is further to:
communicate the information to the server purchase activity assistance system.

55. A computer program product comprising a non-transitory computer-readable medium comprising computer-readable instructions for execution by a customer purchase activity assistance system, the instructions configured for assisting a customer considering a purchase of a product, the instructions comprising:
instructions for establishing a combined historical behavior pattern by:
receiving customer input indicating one or more historical instances when the customer made a purchase and subsequently considered the purchase an undesired purchase, the customer input stored as historical purchase activity data indicating predetermined undesired purchasing behavior;
collecting and storing historical physiological activity data from the customer contemporaneously with the historical instances when the customer made a purchase subsequently considered an undesired purchase; and
correlating the historical purchase activity data and the historical physiological activity data such that each undesired purchase is correlated to physiological activity indicative of future undesired purchasing behavior;
instructions for collecting, by a data collection system, current data, the instructions for collecting comprising:
instructions for collecting, by the data collection system, current physiological activity data;
instructions for communicating, by a communication device, the current physiological activity data to a server purchase activity assistance system for assessment, by the server purchase activity assistance system, of the likelihood of vulnerability to a predetermined undesired purchasing behavior by comparing the combined historical behavior pattern indicative of future undesired purchasing behavior and corresponding to the customer with the collected current data;
instructions for receiving, by a customer alerting system, instructions for producing an alert based at least in part on the server purchase activity assistance system assessment of the likelihood of vulnerability to the predetermined undesired purchasing behavior; and
instructions for producing an alert based at least in part on the received instructions.

56. The computer program product of claim 55, the instructions further comprising:
instructions for collecting, by the data collection system, historical data comprising the historical physiological activity; and
instructions for communicating, by the communication device, the historical data to the server purchase activity assistance system for correlation of the historical physiological activity data and historical purchase activity data and distilling at least a baseline behavior pattern and an excited behavior pattern from the collected and correlated historical data, the baseline behavior pattern comprising combinations of historical data tending to indicate a low likelihood of vulnerability to the predetermined undesired purchase behavior and the excited behavior pattern comprising combinations of historical data tending to indicate a high likelihood of vulnerability to the predetermined undesired purchase behavior.

57. The computer program product of claim 56, the instructions for collecting the current physiological activity data comprise:
instructions for collecting, by an electrodermal sensor of the data collection system in physiological communication with the customer, electrodermal activity data, and wherein the instructions for collecting historical data comprise:
instructions for collecting, by the electrodermal sensor, historical electrodermal activity data.

58. The computer program product of claim 55, the instructions further comprising:
instructions for collecting, by the data collection system, historical data comprising the historical physiological activity data, historical global positioning data, and historical temporal data; and
instructions for communicating, by the communication device, the historical data to the server purchase activity assistance system for combining the historical physiological activity data, the historical global positioning data, and the historical temporal data, thereby establishing a combined historical behavior pattern, correlation of the combined historical behavior pattern and historical purchase activity data, and distilling at least a baseline behavior pattern and an excited behavior pattern from the collected and correlated historical data, the baseline behavior pattern comprising combinations of historical data tending to indicate a low likelihood of vulnerability to the predetermined undesired purchase behavior and the excited behavior pattern comprising combinations of historical data tending to indicate a high likelihood of vulnerability to the predetermined undesired purchase behavior.

59. The computer program product of claim 55, the instructions further comprising:
instructions for receiving information, by a customer information receiving system, defining a purchase activity assistance index, the information comprising information defining one or more predetermined undesired purchase behaviors; and
instructions for communicating, by the communication device, the information to the server purchase activity assistance system.

* * * * *

UNITED STATES PATENT AND TRADEMARK OFFICE
CERTIFICATE OF CORRECTION

| | | |
|---|---|---|
| PATENT NO. | : 8,417,584 B2 | Page 1 of 1 |
| APPLICATION NO. | : 12/846582 | |
| DATED | : April 9, 2013 | |
| INVENTOR(S) | : Erik Stephen Ross | |

It is certified that error appears in the above-identified patent and that said Letters Patent is hereby corrected as shown below:

In the Claims:

Correct Claim 13, Column 35, Line 29. Please change "claim 2" to --claim 1--.

Signed and Sealed this
Twenty-eighth Day of May, 2013

Teresa Stanek Rea
*Acting Director of the United States Patent and Trademark Office*